United States Patent
Muralidhar et al.

(10) Patent No.: US 11,294,882 B2
(45) Date of Patent: *Apr. 5, 2022

(54) TRANSACTIONAL PROCESSING OF CHANGE TRACKING DATA

(71) Applicant: Snowflake Inc., Bozeman, MT (US)

(72) Inventors: Subramanian Muralidhar, Mercer Island, WA (US); Istvan Cseri, Seattle, WA (US); Torsten Grabs, San Mateo, CA (US); Benoit Dageville, San Mateo, CA (US)

(73) Assignee: Snowflake Inc., Bozeman, MT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/491,106

(22) Filed: Sep. 30, 2021

(65) Prior Publication Data

US 2022/0019570 A1 Jan. 20, 2022

Related U.S. Application Data

(63) Continuation of application No. 17/364,562, filed on Jun. 30, 2021, now Pat. No. 11,169,983, which is a
(Continued)

(51) Int. Cl.
*G06F 16/23* (2019.01)
*G06F 16/245* (2019.01)
(Continued)

(52) U.S. Cl.
CPC ...... *G06F 16/2358* (2019.01); *G06F 16/1865* (2019.01); *G06F 16/2322* (2019.01);
(Continued)

(58) Field of Classification Search
CPC ............. G06F 16/2358; G06F 16/2322; G06F 16/278; G06F 9/466
(Continued)

(56) References Cited

U.S. PATENT DOCUMENTS 5,625,815 A 4/1997 Maier et al.
5,630,124 A 5/1997 Coyle, Jr. et al.
(Continued)

FOREIGN PATENT DOCUMENTS

WO WO-2018021593 A1 * 2/2018 ............ G06F 16/00
WO WO-2020/117957 A1 6/2020

OTHER PUBLICATIONS

"U.S. Appl. No. 16/213,554, Examiner Interview Summary dated Apr. 23, 2021", 2 pgs.
(Continued)

*Primary Examiner* — Phuong Thao Cao
(74) *Attorney, Agent, or Firm* — Schwegman Lundberg & Woessner, P.A.

(57) ABSTRACT

Systems, methods, and devices for transactional processing of change tracking data for a database are discussed. A method includes generating a micro-partition based on execution of a transaction on a table of a database, the micro-partition reflecting changes made to the table by the transaction. A change tracking entry is generated in response to the execution of the transaction. The change tracking entry includes an indication of one or more modifications made to the table by the transaction and an indication of the micro-partition generated based on the execution of the transaction. The change tracking entry is stored in the micro-partition as metadata. At least one existing micro-partition is removed from the table, responsive to storing the change tracking entry.

25 Claims, 12 Drawing Sheets

Related U.S. Application Data continuation of application No. 16/213,554, filed on Dec. 7, 2018, now Pat. No. 11,086,840.

(51) Int. Cl.
*G06F 16/27* (2019.01)
*G06F 9/46* (2006.01)
*G06F 16/18* (2019.01)

(52) U.S. Cl.
CPC ........ *G06F 16/2365* (2019.01); *G06F 16/245* (2019.01); *G06F 16/278* (2019.01); *G06F 9/466* (2013.01)

(58) Field of Classification Search
USPC .......................................................... 707/703
See application file for complete search history.

(56) References Cited

U.S. PATENT DOCUMENTS

| | | | |
|---|---|---|---|
| 5,652,863 A | 7/1997 | Asensio et al. | |
| 6,185,699 B1 | 2/2001 | Haderle et al. | |
| 6,336,134 B1 | 1/2002 | Varma | |
| 6,584,453 B1 | 6/2003 | Kaplan et al. | |
| 6,622,152 B1 | 9/2003 | Sinn et al. | |
| 6,889,231 B1* | 5/2005 | Souder | G06F 16/27 |
| 6,901,497 B2* | 5/2005 | Tashiro | G06F 3/0676 |
| | | | 711/173 |
| 6,954,765 B2* | 10/2005 | Spiegel | G06F 3/0619 |
| 7,222,136 B1 | 5/2007 | Brown et al. | |
| 7,380,094 B2 | 5/2008 | Igarashi et al. | |
| 7,895,186 B2 | 2/2011 | Yu | |
| 8,024,296 B1* | 9/2011 | Gopinathan | G06Q 10/109 |
| | | | 707/648 |
| 8,230,434 B2 | 7/2012 | Armstrong et al. | |
| 8,321,420 B1* | 11/2012 | Sinclair | G06F 16/2228 |
| | | | 707/741 |
| 8,825,601 B2 | 9/2014 | Huynh Huu et al. | |
| 9,244,826 B2 | 1/2016 | Nayar et al. | |
| 9,607,019 B1 | 3/2017 | Swift et al. | |
| 9,705,932 B1 | 7/2017 | Gell | |
| 9,904,721 B1 | 2/2018 | Holenstein et al. | |
| 10,025,845 B1 | 7/2018 | Holenstein et al. | |
| 10,031,935 B1 | 7/2018 | Cole et al. | |
| 10,108,632 B2 | 10/2018 | Kanthak et al. | |
| 10,216,820 B1 | 2/2019 | Holenstein et al. | |
| 10,366,075 B2 | 7/2019 | Tomoda et al. | |
| 10,417,212 B1 | 9/2019 | Hensley et al. | |
| 10,423,493 B1* | 9/2019 | Vig | G06F 16/2322 |
| 10,621,049 B1 | 4/2020 | Certain et al. | |
| 10,997,151 B2 | 5/2021 | Muralidhar et al. | |
| 11,086,840 B2 | 8/2021 | Muralidhar et al. | |
| 11,169,983 B1 | 11/2021 | Muralidhar et al. | |
| 11,182,372 B1* | 11/2021 | Jain | G06F 11/1464 |
| 2002/0147900 A1 | 10/2002 | Tashiro et al. | |
| 2003/0115206 A1 | 6/2003 | Gilbert | |
| 2004/0054644 A1 | 3/2004 | Ganesh et al. | |
| 2004/0199552 A1 | 10/2004 | Ward et al. | |
| 2006/0253483 A1 | 11/2006 | Yu | |
| 2006/0288035 A1 | 12/2006 | Viavant | |
| 2008/0077927 A1 | 3/2008 | Armstrong et al. | |
| 2008/0098045 A1 | 4/2008 | Radhakrishnan et al. | |
| 2008/0250073 A1 | 10/2008 | Nori et al. | |
| 2010/0106734 A1 | 4/2010 | Calder et al. | |
| 2010/0106934 A1* | 4/2010 | Calder | G06F 3/0605 |
| | | | 711/173 |
| 2010/0115226 A1 | 5/2010 | Ueno | |
| 2010/0161928 A1 | 6/2010 | Sela et al. | |
| 2010/0235606 A1 | 9/2010 | Oreland et al. | |
| 2010/0274768 A1 | 10/2010 | Wang et al. | |
| 2010/0318746 A1 | 12/2010 | Troxel et al. | |
| 2011/0093435 A1 | 4/2011 | Zha et al. | |
| 2011/0145201 A1 | 6/2011 | Holst et al. | |
| 2011/0191299 A1 | 8/2011 | Huynh et al. | |
| 2011/0251997 A1 | 10/2011 | Wang et al. | |
| 2012/0166400 A1 | 6/2012 | Sinclair et al. | |
| 2013/0024422 A1 | 1/2013 | Konagolli et al. | |
| 2013/0151521 A1 | 6/2013 | Gislason | |
| 2013/0159247 A1 | 6/2013 | Engelko | |
| 2013/0166556 A1 | 6/2013 | Baeumges et al. | |
| 2013/0254590 A1 | 9/2013 | Chercoles Sanchez et al. | |
| 2013/0311421 A1 | 11/2013 | Erdogan et al. | |
| 2013/0311441 A1 | 11/2013 | Erdogan et al. | |
| 2014/0025899 A1 | 1/2014 | Dean et al. | |
| 2014/0156666 A1 | 6/2014 | Jagtiani et al. | |
| 2014/0279843 A1 | 9/2014 | Von Weihe | |
| 2014/0279847 A1 | 9/2014 | Schreter et al. | |
| 2015/0032694 A1 | 1/2015 | Rajamani et al. | |
| 2015/0066848 A1 | 3/2015 | Oliver et al. | |
| 2015/0066884 A1 | 3/2015 | Tomarkin | |
| 2015/0081666 A1 | 3/2015 | Long | |
| 2015/0088830 A1 | 3/2015 | Kamp et al. | |
| 2015/0177988 A1 | 6/2015 | Rozental | |
| 2015/0242451 A1 | 8/2015 | Bensberg et al. | |
| 2015/0254264 A1 | 9/2015 | Yu et al. | |
| 2015/0317349 A1 | 11/2015 | Chao et al. | |
| 2015/0347401 A1 | 12/2015 | Raghavan et al. | |
| 2015/0363483 A1 | 12/2015 | Behnen et al. | |
| 2015/0379038 A1 | 12/2015 | Nikolov | |
| 2016/0019254 A1 | 1/2016 | Vijayrao et al. | |
| 2016/0041906 A1 | 2/2016 | Mukherjee et al. | |
| 2016/0048792 A1 | 2/2016 | Finkelstein et al. | |
| 2016/0070589 A1 | 3/2016 | Vermeulen et al. | |
| 2016/0070726 A1 | 3/2016 | Macnicol et al. | |
| 2016/0092491 A1 | 3/2016 | Cowling et al. | |
| 2016/0117115 A1 | 4/2016 | Mehra et al. | |
| 2016/0125018 A1* | 5/2016 | Tomoda | G06F 16/2455 |
| | | | 707/703 |
| 2016/0147612 A1 | 5/2016 | Schefe et al. | |
| 2016/0147786 A1* | 5/2016 | Andrei | G06F 16/1756 |
| | | | 707/695 |
| 2016/0283545 A1 | 9/2016 | Benke et al. | |
| 2016/0299948 A1 | 10/2016 | Konik et al. | |
| 2016/0321145 A1 | 11/2016 | Fang et al. | |
| 2016/0350392 A1* | 12/2016 | Rice | G06F 16/27 |
| 2016/0371319 A1 | 12/2016 | Park et al. | |
| 2016/0378826 A1 | 12/2016 | Bensberg et al. | |
| 2017/0093755 A1 | 3/2017 | Pol et al. | |
| 2017/0132429 A1 | 5/2017 | Bell et al. | |
| 2017/0147664 A1 | 5/2017 | Bussler et al. | |
| 2017/0149892 A1 | 5/2017 | Chhatpar | |
| 2017/0177700 A1 | 6/2017 | Bensberg et al. | |
| 2017/0228166 A1 | 8/2017 | Zhang et al. | |
| 2017/0270153 A1 | 9/2017 | Bantupalli et al. | |
| 2017/0270175 A1 | 9/2017 | Bantupalli et al. | |
| 2018/0068008 A1 | 3/2018 | Cruanes et al. | |
| 2018/0144015 A1 | 5/2018 | Mittur Venkataramanappa et al. | |
| 2018/0150544 A1 | 5/2018 | Bensberg et al. | |
| 2018/0246934 A1 | 8/2018 | Arye et al. | |
| 2018/0268017 A1 | 9/2018 | Parikh et al. | |
| 2018/0268027 A1* | 9/2018 | Gold | G06F 16/2379 |
| 2018/0322127 A1 | 11/2018 | Davis et al. | |
| 2018/0322128 A1* | 11/2018 | Davis | G06F 16/278 |
| 2019/0057124 A1 | 2/2019 | D'halluin et al. | |
| 2019/0057133 A1 | 2/2019 | Chainani et al. | |
| 2019/0065573 A1 | 2/2019 | Keller | |
| 2019/0079965 A1 | 3/2019 | Pareek et al. | |
| 2019/0102415 A1 | 4/2019 | Bishnoi et al. | |
| 2019/0294596 A1 | 9/2019 | Yan et al. | |
| 2019/0303486 A1* | 10/2019 | Zhuge | G06F 16/278 |
| 2019/0325052 A1 | 10/2019 | Bastawala et al. | |
| 2019/0332582 A1 | 10/2019 | Kumar et al. | |
| 2019/0340185 A1 | 11/2019 | Seela et al. | |
| 2019/0370353 A1* | 12/2019 | Doddameti | G06F 16/182 |
| 2019/0370365 A1 | 12/2019 | Chalakov et al. | |
| 2019/0377813 A1 | 12/2019 | Funke et al. | |
| 2019/0391884 A1 | 12/2019 | Gottapu et al. | |
| 2019/0392047 A1 | 12/2019 | Sorenson, III | |
| 2019/0392061 A1 | 12/2019 | Terry et al. | |
| 2020/0012659 A1 | 1/2020 | Dageville et al. | |
| 2020/0026695 A1 | 1/2020 | Yan et al. | |
| 2020/0034365 A1 | 1/2020 | Martin et al. | |
| 2020/0142980 A1 | 5/2020 | Cseri et al. | |
| 2020/0167340 A1 | 5/2020 | Cseri et al. | |

(56) References Cited

U.S. PATENT DOCUMENTS

| | | | |
|---|---|---|---|
| 2020/0167343 A1 | 5/2020 | Cseri et al. |
| 2020/0183908 A1 | 6/2020 | Muralidhar et al. |
| 2020/0183909 A1 | 6/2020 | Muralidhar et al. |
| 2020/0192888 A1 | 6/2020 | Schreter |
| 2021/0157785 A1 | 5/2021 | Muralidhar et al. |
| 2021/0326324 A1 | 10/2021 | Muralidhar et al. |

OTHER PUBLICATIONS

"U.S. Appl. No. 16/213,554, Examiner Interview Summary dated Dec. 4, 2020", 2 pgs.
"U.S. Appl. No. 16/213,554, Final Office Action dated Oct. 5, 2020", 47 pgs.
"U.S. Appl. No. 16/213,554, Non-Final Office Action dated Jun. 16, 2020", 46 pgs.
"U.S. Appl. No. 16/213,554, Non-Final Office Action dated Dec. 28, 2020", 51 pgs.
"U.S. Appl. No. 16/213,554, Notice of Allowance dated May 13, 2021", 11 pgs.
"U.S. Appl. No. 16/213,554, Preliminary Amendment Filed Nov. 12, 2019", 14 pgs.
"U.S. Appl. No. 16/213,554, Response filed Apr. 23, 2021 to Non-Final Office Action dated Dec. 28, 2020", 15 pgs.
"U.S. Appl. No. 16/213,554, Response filed Sep. 16, 2020 to Non-Final Office Action dated Jun. 16, 2020", 17 pgs.
"U.S. Appl. No. 16/213,554, Response filed Dec. 4, 2020 to Final Office Action dated Oct. 5, 2020", 15 pgs.
"U.S. Appl. No. 16/705,566, Advisory Action dated Oct. 21, 2020", 3 pgs.
"U.S. Appl. No. 16/705,566, Examiner Interview Summary dated Jun. 15, 2020", 3 pgs.
"U.S. Appl. No. 16/705,566, Examiner Interview Summary dated Oct. 13, 2020", 3 pgs.
"U.S. Appl. No. 16/705,566, Final Office Action dated Aug. 11, 2020", 41 pgs.
"U.S. Appl. No. 16/705,566, Non-Final Office Action dated Mar. 12, 2020".
"U.S. Appl. No. 16/705,566, Notice of Allowance dated Jan. 21, 2021", 9 pgs.
"U.S. Appl. No. 16/705,566, Notice of Allowance dated Nov. 18, 2020", 11 pgs.
"U.S. Appl. No. 16/705,566. Response Filed Jun. 12, 2020 to Non-Final Office Action dated Mar. 12, 2020", 14 pgs.
"U.S. Appl. No. 16/705,566, Response filed Oct. 9, 2020 to Final Office Action dated Aug. 11, 2020", 15 pgs.
"U.S. Appl. No. 16/705,566, Response filed Oct. 29, 2020 to Advisory Action dated Oct. 21, 2020", 15 pgs.
"U.S. Appl. No. 17/364,562, Notice of Allowance dated Sep. 7, 2021".
"International Application Serial No. PCT/US2019/064507, International Preliminary Report on Patentability dated Jun. 17, 2021", 12 pgs.
"International Application Serial No. PCT/US2019/064507, International Search Report dated Feb. 11, 2020", 2 pgs.
"International Application Serial No. PCT/US2019/064507, Written Opinion dated Feb. 11, 2020", 10 pgs.
"Understanding Micro-Partitions and Data Clustering", Snowflake Knowledge Base, [online]. [retrieved on Aug. 6, 2020]. Retrieved from the Internet: <URL: https://support.snowflake.net/s/article/understanding-micro-partitions-and-data-clustering>, (Dec. 9, 2016), 8 pgs.
Friend, D., "Why Immutability Should be a Standard Feature in Cloud Storage", EnterpriseAI, [online]. [retrieved on Aug. 6, 2020]. Retrieved from the Internet: <URL: https://www.enterpriseai.news/2017/09/05/immutability-standard-feature-cloud-storage>, (Sep. 5, 2017), 3 pgs.
Zukowski, M., "How Snowflake Internally Performs Updates?", Stack Overflow website, [online], [retrieved on Aug. 6, 2020]. Retrieved from the Internet: <URL: <https://stackoverflow.com/questions/48653924/how-snowflake-internally-performs-updates>, (Feb. 7, 2018), 1 pg.
"U.S. Appl. No. 17/364,562, Supplemental Notice of Allowability dated Oct. 12, 2021", 2 pgs.

* cited by examiner

Deleting Rows From Table
200

| Micro-Partition 2 | | | |
|---|---|---|---|
| COLUMN 1 | COLUMN 2 | METADATA NAME | METADATA ROW |
| 1 | value1 | NULL (MP2) | NULL (1) |
| 2 | value2 | NULL (MP2) | NULL (2) |
| 3 | value3 | NULL (MP2) | NULL (3) |
| 4 | value4 | NULL (MP2) | NULL (3) |

Deleting rows 2 and 3

| Micro-Partition 4 | | | |
|---|---|---|---|
| COLUMN 1 | COLUMN 2 | METADATA NAME | METADATA ROW |
| 1 | value1 | MP2 | 1 |
| 4 | value4 | MP2 | 4 |

Delta Information After Delete
210

| DELTA 210 | | | |
|---|---|---|---|
| COLUMN 1 | COLUMN 2 | METADATA ACTION | METADATA IS UPDATE |
| 2 | value2 | DELETE | FALSE |
| 3 | value3 | DELETE | FALSE |

FIG. 2

| Micro-Partition 3 | Inserting Rows Into Table 300 | | |
|---|---|---|---|
| COLUMN 1 | COLUMN 2 | METADATA NAME | METADATA ROW |
| 21 | value21 | NULL (MP3) | NULL (1) |
| 22 | value22 | NULL (MP3) | NULL (2) |
| 23 | value23 | NULL (MP3) | NULL (3) |

Inserting rows 17 and 18

| Micro-Partition 5 | | | |
|---|---|---|---|
| COLUMN 1 | COLUMN 2 | METADATA NAME | METADATA ROW |
| 21 | value21 | MP3 | 1 |
| 22 | value22 | MP3 | 2 |
| 23 | value23 | MP3 | 3 |
| 24 | value17 | NULL | NULL |
| 25 | value18 | NULL | NULL |

| DELTA 310 | Delta Information After Inserting Rows 310 | | |
|---|---|---|---|
| COLUMN 1 | COLUMN 2 | METADATA ACTION | METADATA IS UPDATE |
| 17 | value17 | INSERT | FALSE |
| 18 | value18 | INSERT | FALSE |

FIG. 3

Updating Rows In Table 400

Micro-Partition 78

| COLUMN 1 | COLUMN 2 | METADATA NAME | METADATA ROW |
|---|---|---|---|
| 1 | value1 | NULL (MP78) | NULL (1) |
| 2 | value2 | NULL (MP78) | NULL (2) |
| 3 | value3 | NULL (MP78) | NULL (3) |
| 4 | value4 | NULL (MP78) | NULL (3) |

Updating rows 1 and 4 to new values

Micro-Partition 91

| COLUMN 1 | COLUMN 2 | METADATA NAME | METADATA ROW |
|---|---|---|---|
| 1 | VALUE11 | MP78 | 1 |
| 2 | value2 | MP78 | 2 |
| 3 | value3 | MP78 | 3 |
| 4 | VALUE44 | MP78 | 4 |

Delta Information After Updating Rows In Table 410

DELTA 410

| COLUMN 1 | COLUMN 2 | METADATA ACTION | METADATA IS UPDATE |
|---|---|---|---|
| 1 | value1 | DELETE | TRUE |
| 4 | value4 | DELETE | TRUE |
| 1 | VALUE11 | INSERT | TRUE |
| 4 | VALUE44 | INSERT | TRUE |

FIG. 4

TRANSACTIONAL PROCESSING OF CHANGE TRACKING DATA

CROSS-REFERENCE TO RELATED APPLICATION

This application is a Continuation of U.S. patent application Ser. No. 17/364,562 filed Jun. 30, 2021 (now issued as U.S. Pat. No. 11,169,983), which is a Continuation of U.S. patent application Ser. No. 16/213,554 filed Dec. 7, 2018 (now issued as U.S. Pat. No. 11,086,840), the contents of which are incorporated herein by reference in their entirety.

TECHNICAL FIELD

The present disclosure relates to systems, methods, and devices for databases and more particularly relates to generating a transactional stream of change tracking information.

BACKGROUND

Databases are widely used for data storage and access in computing applications. Databases may include one or more tables that include or reference data that can be read, modified, or deleted using queries. Databases can store anywhere from small to extremely large sets of data within one or more tables. This data can be accessed by various users in an organization or even be used to service public users, such as via a website or an application program interface (API). Both computing and storage resources, as well as their underlying architecture, can play a significant role in achieving desirable database performance.

Database data can be modified by various commands, including insert, delete, and update commands that modify one or more rows in a database table. It can be costly to track such modifications and to determine delta information a first set of database data and a second set of database data. Systems, methods, and devices for efficient and cost-effective generation of transactional change tracking information are disclosed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

FIG. 2 is a block diagram illustrating a delete command performed on a micro-partition of a database, according to one embodiment;

FIG. 3 is a block diagram illustrating an insert command performed on a micro-partition of a database, according to one embodiment;

FIG. 4 is a block diagram illustrating an update command performed on a micro-partition of a database, according to one embodiment;

DETAILED DESCRIPTION

Figure 1A:
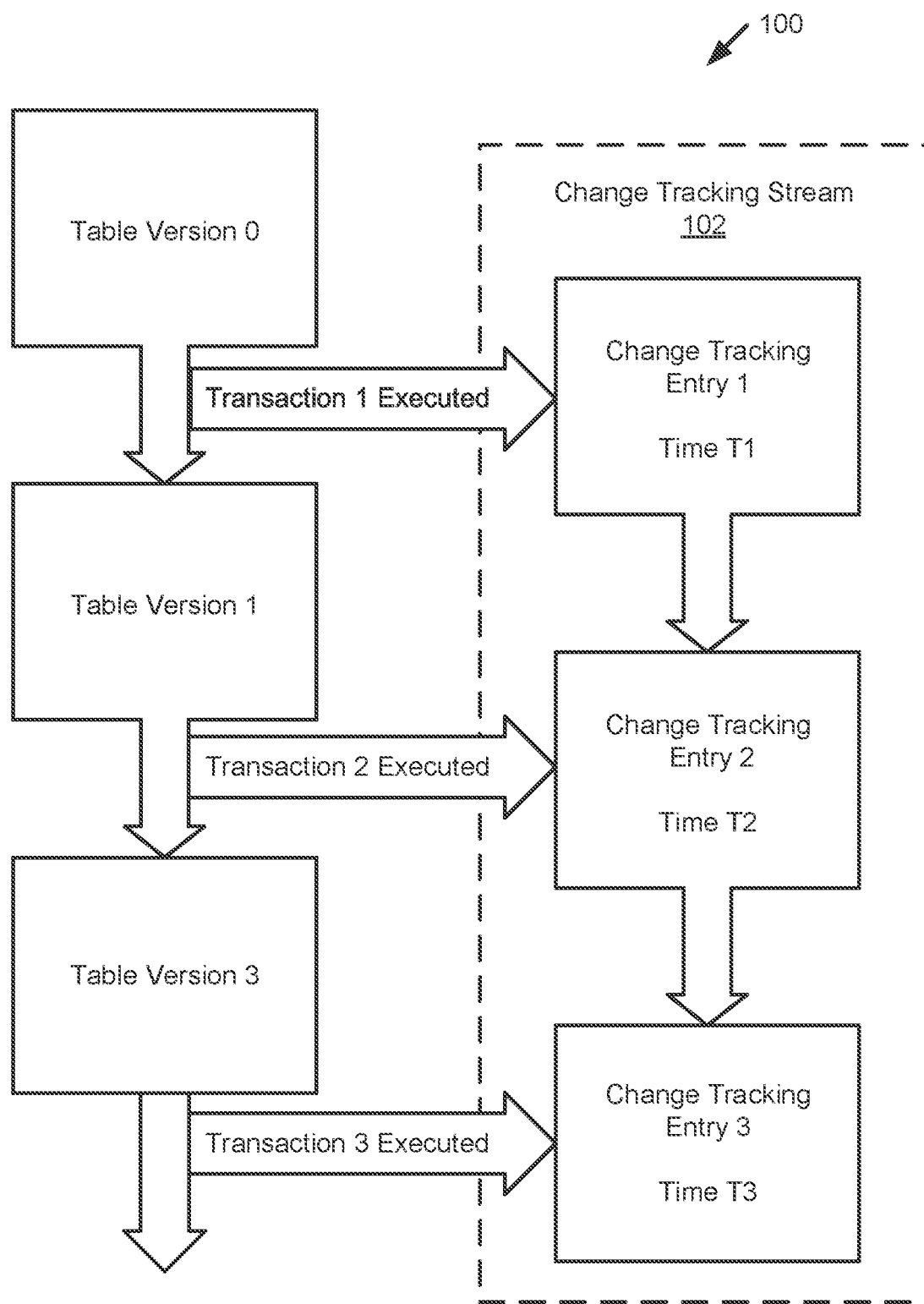
FIG. 1A is a block diagram illustrating a table history and an associated change tracking stream, according to one embodiment.

Systems, methods, and devices for tracking a series of changes to database data and for generating a transactional stream of modifications made to a database table are disclosed. Database change tracking enables a user to determine how a database has been modified over time. Such database modifications may be initiated by a data manipulation language (DML) command such as an insert, update, or delete command. Most commonly, such modifications include the ingestion of data over time and may particularly include continuous data ingestion in some implementations. A change tracking stream may be generated to provide a summary of all modifications that have been performed on a database table. Specifically, as disclosed herein, a transaction change tracking stream provides a plurality of change tracking entries, wherein each of the change tracking entries provides a summary of a transactional modification made to a database table.

Information stored in the change tracking stream may be utilized to return a summary of what rows have changed in a database table and how those rows have changed over time. A delta may be returned for a database that indicates which rows have changed and how they have changed between two timestamps and does not include information on all intermediate changes that occurred between the two timestamps. A comprehensive change tracking summary may be returned that indicates how data has changed between two timestamps and includes all intermediate changes that occurred between the first timestamp and the second timestamp. Further, a summary may be generated that comprises a report of how a database table has been modified since a prior reading of the change tracking stream.

The transactional change tracking stream as disclosed herein provides significant benefits over other change tracking systems and methods known in the art. Specifically, the transactional nature of the change tracking stream enables a user to return delta information from the last time a change tracking entry was added to the stream and the stream was advanced. Further, a user may return delta information between a first timestamp and a second timestamp, where each of the timestamps may indicate a time when a transaction was executed on the database table. Additionally, because the change tracking stream is advanced only after a transaction has been fully executed, the reliability of the change tracking information is greater than that in other change tracking systems and methods known in the art.

Additionally, change tracking is historically very costly and requires significant resources and storage capacity. A comprehensive change tracking summary is historically generated by determining a modification that has occurred between all sequential pairs of transactions that occur on the table. For example, a modification will be determined between a timestamp zero and a timestamp one; a change will be determined between a timestamp one and a timestamp two; a change will be determined between a timestamp two and a timestamp three, and so forth. The modifications may be determined by comparing the data within the table at the timestamp zero and at the timestamp one, and so forth for each sequential pair of transactions in a relevant time period. This can require enormous sums of data to be stored in the database and can be extremely costly and time intensive to perform. The series of modifications may then be reported to indicate all modifications that occurred on the table in a relevant time period where such modification include, for example, updates, deletes, inserts, or merges on the database data. However, the change tracking stream as disclosed herein provides a cost-effective means to provide a transactional summary of modifications that have been executed on a database table over time.

Systems, methods, and devices disclosed herein provide a low-cost means for generating a transactional change tracking stream. The change tracking stream may be queried to return a delta between two timestamps, wherein the delta indicates all net modifications made to the table between the two timestamps. Additionally, the change tracking stream may be queried to return a comprehensive change tracking summary that includes all modifications that have occurred on a database table in a relevant time period, including incremental modifications that may have been reversed by subsequent transactions. Such systems, methods, and devices for change tracking, as disclosed herein, significantly reduce the storage capacity and computing resources that are required for analyzing database transactions and/or modifications over a time period.

A database may include one or more tables storing database data. A table is a collection of related data held in a structured format within the database and may include columns and rows. A database table may be altered in response to a data manipulation (DML) command such as an insert command, a delete command, an update command, a merge command, and so forth. Such modifications may be referred to as a transaction that occurred on the database table. In an embodiment, each transaction includes a timestamp indicating when the transaction was received and/or when the transaction was fully executed. In an embodiment, a transaction includes multiple alterations made to a table, and such alterations may impact one or more micro-partitions in the table. In an embodiment, data may be continuously ingested, or may be ingested at determined time intervals, and the ingestion of data into the database is a transaction occurring on the database.

A database table may store data in a plurality of micro-partitions, wherein the micro-partitions are immutable storage devices. When a transaction is executed on a such a table, all impacted micro-partitions are recreated to generate new micro-partitions that reflect the modifications of the transaction. After a transaction is fully executed, any original micro-partitions that were recreated may then be removed from the database. A new version of the table is generated after each transaction that is executed on the table. The table may undergo many versions over a time period if the data in the table undergoes many changes, such as inserts, deletes, updates, and/or merges. Each version of the table may include metadata indicating what transaction generated the table, when the transaction was ordered, when the transaction was fully executed, and how the transaction altered one or more rows in the table. The disclosed systems, methods, and devices for low-cost table versioning may be leveraged to provide an efficient means for generating a transactional change tracking stream that indicates all modifications that have been made to a table between a first timestamp and a second timestamp.

Change tracking information can be stored as metadata in a database. This metadata describes the data that is stored in database tables of customers but is not actually the stored table data. Metadata can get very large, especially if there are large database tables of many customers. Current database systems have severe limitations handling large amounts of metadata. Current database systems store metadata in mutable storage devices and services, including main memory, file systems, and key-value stores. These devices and services allow the metadata to be updated data in-place. If a data record changes, it may be updated with the new information and the old information is overwritten. This allows databases to easily maintain mutable metadata by updating metadata in-place.

However, these mutable storage devices and services have limitations. The limitations are at least two-fold. First, mutable storage devices such as main memory and file systems have a hard limit in terms of storage capacity. If the size of the metadata exceeds these limits, it is impossible to store more metadata there. Second, mutable storage services such as key-value stores perform poorly when reading large volumes of metadata. Reading data is performed using range scans, which take a long time to finish. In practice, range scans can take many minutes or even approach an hour to complete in large scale deployments.

These limitations make it impossible to store large amounts of metadata in existing mutable storage devices and services. Systems, methods, and devices disclosed herein provide for improved metadata storage and management that includes storing metadata in immutable (non-mutable) storage such as micro-partitions. As used herein, immutable or non-mutable storage includes storage where data cannot or is not permitted to be overwritten or updated in-place. For example, changes to data that is located in a cell or region of storage media may be stored as a new file in a different, time-stamped, cell or region of the storage media. Mutable storage may include storage where data is permitted to be overwritten or updated in-place. For example, data in a given cell or region of the storage media can be overwritten when there are changes to the data relevant to that cell or region of the storage media.

In one embodiment, metadata is stored and maintained on non-mutable storage services in the cloud. These storage services may include, for example, Amazon S3®, Microsoft Azure Blob Storage®, and Google Cloud Storage®. Many of these services do not allow to update data in-place (i.e., are non-mutable or immutable). Data files may only be added or deleted, but never updated. In one embodiment, storing and maintaining metadata on these services requires that, for every change in metadata, a metadata file is added to the storage service. These metadata files may be periodically consolidated into larger "compacted" or consolidated metadata files in the background.

In an embodiment, all data in tables is automatically divided into an immutable storage device referred to as a micro-partition. The micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular pruning of very large tables, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description to provide a thorough understanding of the embodiments disclosed herein, some embodiments may be practiced without some or all these details. Moreover, for the purpose of clarity, certain technical material that is known in the related art has not been described in detail to avoid unnecessarily obscuring the disclosure.

In an embodiment, a method for generating a transactional change tracking stream is disclosed. The method includes executing a transaction on a table of a database, wherein the table comprises a micro-partition and the transaction is executed on the micro-partition. The method includes, in response to the transaction being fully executed, generating a change tracking entry comprising an indication of one or more modifications made to the table by the transaction. The method includes storing the change tracking entry in a change tracking stream, wherein the change tracking stream comprises one or more sequential change tracking entries that each correspond to a different transaction that is fully executed on the table.

In an embodiment, executing the transaction includes generating one or more new micro-partitions. In an embodiment, a micro-partition is never amended but is instead recreated by generating a new micro-partition that reflects the transaction and removing the (original) micro-partition. In an embodiment, a single transaction impacts a plurality of micro-partitions of a database table. For example, a transaction may cause a plurality of rows of database data to be deleted and the plurality of rows may be spread across a plurality of micro-partitions of a database table. In such an example, each of the impacted micro-partitions would be recreated without the specified plurality of rows and the (original) micro-partitions would be removed from the database. Further in an embodiment, a transaction may impact only one micro-partition of a database table. For example, a transaction may cause a batch of data to be ingested into the database. In such an example, a new micro-partition may be generated that includes the batch of data to be ingested. Alternatively, a new micro-partition may be generated that includes the batch of data to be ingested in addition to data that was already stored in an existing micro-partition; in such an alternative implementation, the existing micro-partition would be removed from the database after the new micro-partition is fully generated.

In an embodiment, the change tracking entry includes information on the transaction that caused the new micro-partition to be generated. In an implementation where a plurality of new micro-partitions is generated based on one transaction, the change tracking entry will be associated with each of the new micro-partitions. The change tracking entry includes, for example, an identity of a user or account that initiated the transaction, a timestamp when the transaction was requested, a timestamp when execution of the transaction began, a timestamp when execution of the timestamp was completed, a listing of all rows that were modified by the transaction and how those rows were modified, a listing of all micro-partitions that were generated and/or removed based on the transaction, and any other suitable information relevant to the transaction. The change tracking entry may be stored within the new micro-partition as metadata.

In an embodiment, the change tracking entry is associated with a particular micro-partition and the change tracking entry includes information only pertaining to that particular micro-partition. In such an embodiment, the change tracking entry includes only transactional information that pertains to that particular micro-partition even if the transaction impacted additional micro-partitions of table.

In an embodiment, the change tracking entry includes information on what rows were modified by a transaction, what micro-partitions were modified by a transaction, how the rows and/or micro-partitions were modified by the transaction, information on prior modifications on the table, and so forth. A change tracking stream may include a plurality of change tracking entries such that the change tracking stream includes a lineage of modifications made on the table since the table was initially generated or since a particular time. The change tracking stream may include a listing of table versions of the table, including all micro-partitions that are currently part of or were historically part of the table. The change tracking stream may be stored within one or more micro-partition as metadata or may be stored within its own micro-partition as metadata.

Querying the change tracking stream provides an efficient and low-cost means for determining a comprehensive listing of incremental changes made to a database table between two points in time. This is superior to methods known in the art where each of a series of subsequent table versions must be manually compared to determine how the table has been modified over time. Such methods known in the art require extensive storage resources and computing resources to execute.

In an embodiment, the change tracking information is stored as one or more change tracking columns within the (original pre-transaction) micro-partition and/or the new (post-transaction) micro-partition. The change tracking column (i.e. an embodiment of the change tracking stream that is stored within a micro-partition that comprises database data) may include information indicating one or more of: a prior micro-partition name for a row value, a prior row identification for a row value, an action taken on a row value, whether a row value was updated, a log of changes made to a row or row value, a lineage for a row indicating one or more changes made to the row over a time period, a listing of transactions that have initiated a modification to a row, and any other suitable information that may indicate change made to a row or micro-partition or a historical listing of changes that have been made to a row or micro-partition in a table.

In an embodiment, file metadata is stored within metadata storage. The file metadata contains table versions and information about each table data file. Such file metadata may be stored within or separately from the change tracking information. The metadata storage may include mutable storage (storage that can be over written or written in-place), such as a local file system, system, memory, or the like. In one embodiment, the micro-partition metadata consists of two data sets: table versions and file information. The table versions data set includes a mapping of table versions to lists of added files and removed files. File information consists of information about each micro-partition, including micro-partition path, micro-partition size, micro-partition key id, and summaries of all rows and columns that are stored in the micro-partition, for example. Each modification of the table creates new micro-partitions and new micro-partition metadata. Inserts into the table create new micro-partitions. Deletes from the table remove micro-partitions and potentially add new micro-partitions with the remaining rows in a table if not all rows in a micro-partition were deleted. Updates remove micro-partitions and replace them with new micro-partitions with rows containing the updated records.

In one embodiment, metadata may be stored in metadata micro-partitions in immutable storage. In one embodiment, a system may write metadata micro-partitions to cloud storage for every modification of a database table. In one embodiment, a system may download and read metadata micro-partitions to compute the scan set. The metadata micro-partitions may be downloaded in parallel and read as they are received to improve scan set computation. In one embodiment, a system may periodically consolidate metadata micro-partitions in the background. In one embodiment, performance improvements, including pre-fetching, caching, columnar layout and the like may be included. Furthermore, security improvements, including encryption and integrity checking, are also possible with metadata files with a columnar layout.

FIG. 1A illustrates a schematic diagram of a table history 100 with multiple table versions and multiple entries to a change tracking stream 102. The change tracking stream 102 is maintaining a position in the sequence of table versions and can deliver changes from that point onward (i.e. from the first timestamp as referred below) to the transactional timestamp of the database context. The table history 100 illustrates three table versions, namely table version 0, table version 1, and table version 2. The change tracking stream 102 conceptually, but not necessarily materialized in advanced, includes three entries, namely change tracking entry 1, change tracking entry 2, and change tracking entry 3 representing the appropriate table version created. Each transaction can create multiple changes so the change tracking entry represents a set of rows impacted by that transaction. Change tracking entry 1 is entered into the change tracking stream 102 at time T1. Change tracking entry 2 is entered into the change tracking stream 102 at time T2. Change tracking entry 3 is entered into the change tracking stream 102 at time T3. Each of the change tracking entries is entered into the change tracking stream 102 only upon completion of a transaction that is executed on the database table. Transaction 1 is executed on table version 0 and change tracking entry 1 is entered into the change tracking stream 102 upon completion of transaction 1. Transaction 2 is executed on table version 2 and change tracking entry 2 is entered into the change tracking stream 102 upon completion of transaction 2. Transaction 3 is executed on table version 3 and change tracking entry 3 is entered into the change tracking stream 102 upon completion of transaction 3. In an embodiment, the change tracking stream 102 may further include a "change tracking entry 0" that includes metadata about an original version of the table.

The change tracking stream 102 is advanced i.e. a new change tracking entry is added, only after a transaction has been fully executed on the table. If a transaction is initiated on the table, but is cancelled or paused for any reason, a corresponding change tracking entry will not be generated and the change tracking stream 102 will not advance.

The change tracking stream 102 may be read to determine a delta for the table between a first timestamp and a second timestamp. When the change tracking stream 102 is used for auditing purposes, each of the change tracking entries includes the data from the table, the action indicating the type of DML that modified the table, a field indicating whether the data was updated (vs. inserted or deleted), and/or an indication of a transaction that was executed on the table and further includes a timestamp for that transaction. When the change tracking stream 102 is used for delta purposes, each of the change tracking entries may only include the change tracking information representing the difference of the state of the table between the first timestamp and the second timestamp. A query may be run on the change tracking stream 102 to determine which rows of the table have been added, deleted, and/or updated between two timestamps. Further, a query may be run on the change tracking stream 102 to determine a comprehensive change tracking summary between two timestamps, wherein the comprehensive change tracking summary indicates all intermediate modifications that have occurred on the table between two timestamps.

In an embodiment, the change tracking stream 102 is advanced sequentially such that each change tracking entry pertains to a transaction that occurred on the table. The change tracking entries are ordered chronologically according to transaction timestamps.

Figure 1B:
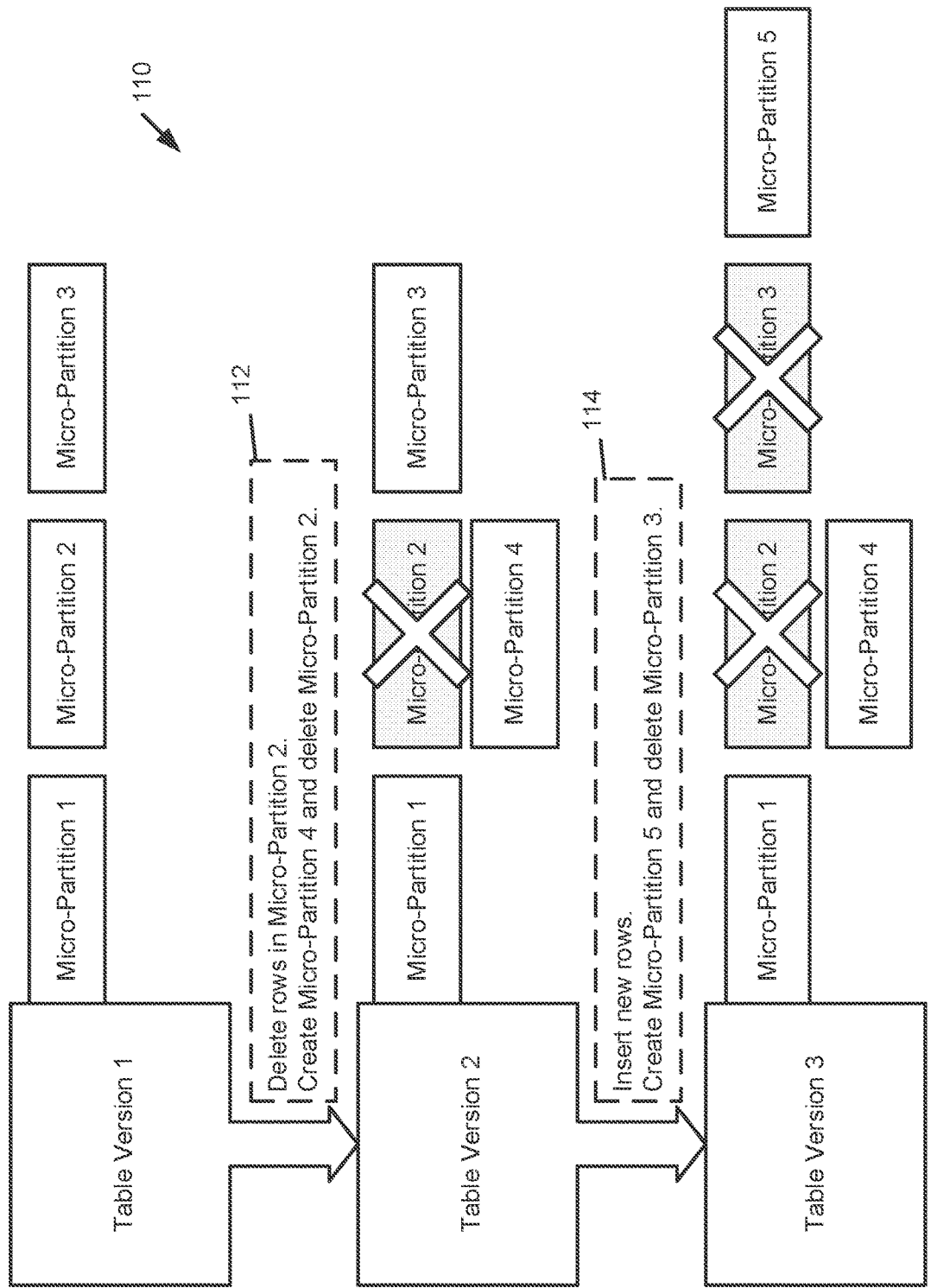
FIG. 1B is a block diagram illustrating modifications made to table versions, according to one embodiment.

FIG. 1B illustrates a schematic block diagram of a table history 110 with multiple table versions. The example table history 110 illustrates three table versions, namely table version 1, table version 2, and table version 3. Table version 1 includes data in the form of three micro-partitions (MPs), namely micro-partition 1 (MP1), micro-partition 2 (MP2), and micro-partition 3 (MP3). A first transaction 112 is executed on table version 1 to generate table version 2. The first transaction 112 includes deleting rows in MP2 to generate a new micro-partition 4 (MP4) and deleting the original MP2. The first transaction 112 executed on table version 1 generates table version 2 which includes the original MP1 and MP3 along with the newly generated MP4. As a result of the first transaction 112, MP2 has been removed from the table as reflected in table version 2. A second transaction 114 is executed on table version 2 to generate table version 3. The second transaction 114 includes inserting new rows such that micro-partition 5 (MP5) is generated and MP3 is removed from the table. Table version 3 includes the original MP1, the MP4 generated as a result of the first transaction 112, and MP5 generated as a result of the second transaction 114. The MP2 was removed as a result of the first transaction 112 and the MP3 was removed from the table as a result of the second transaction 114.

As illustrated in FIG. 1B, a database table may store database data in one or more micro-partitions, wherein the micro-partitions constitute immutable storage devices. When a change or modification is executed on the table, the affected micro-partitions are removed, and new micro-partitions are created that reflect the change. In an embodiment, the original unmodified micro-partition is not removed but is also stored with the new micro-partition. The change may include any command that impacts one or more rows in the table, including for example, a delete command, an insert command, an update command, and/or a merge command.

In an embodiment, a change tracking stream may be queried to generate a comprehensive change tracking summary that indicates all changes that have been made between, for example, table version 1 and table version 3. A comprehensive change tracking summary for the implementation illustrated in FIG. 1B will indicate that a first transaction 112 caused rows to be deleted from MP2 and caused MP4 to be generated without those rows. The summary will further indicate that a second transaction 114 caused new rows to be inserted into the table, caused MP3 to be removed, and caused MP5 to be generated with those new rows. The comprehensive change tracking summary indicates all transactions that occur on the table, when those transactions occurred, and how those transactions impacted the table.

In an embodiment, a change tracking entry is generated only if a transaction is fully executed. Therefore, if a transaction is initiated but is not fully completed, the change tracking stream will not advance. For example, if a transaction is initiated to delete certain rows of an original micro-partition, a new micro-partition will be generated that includes all original rows in the original micro-partition except for those that should be deleted based on the delete command. If the transaction is not completed, i.e. if the new micro-partition is not fully generated, then a new change tracking entry will not be generated, and the change tracking stream will not advance.

Figure 1C:
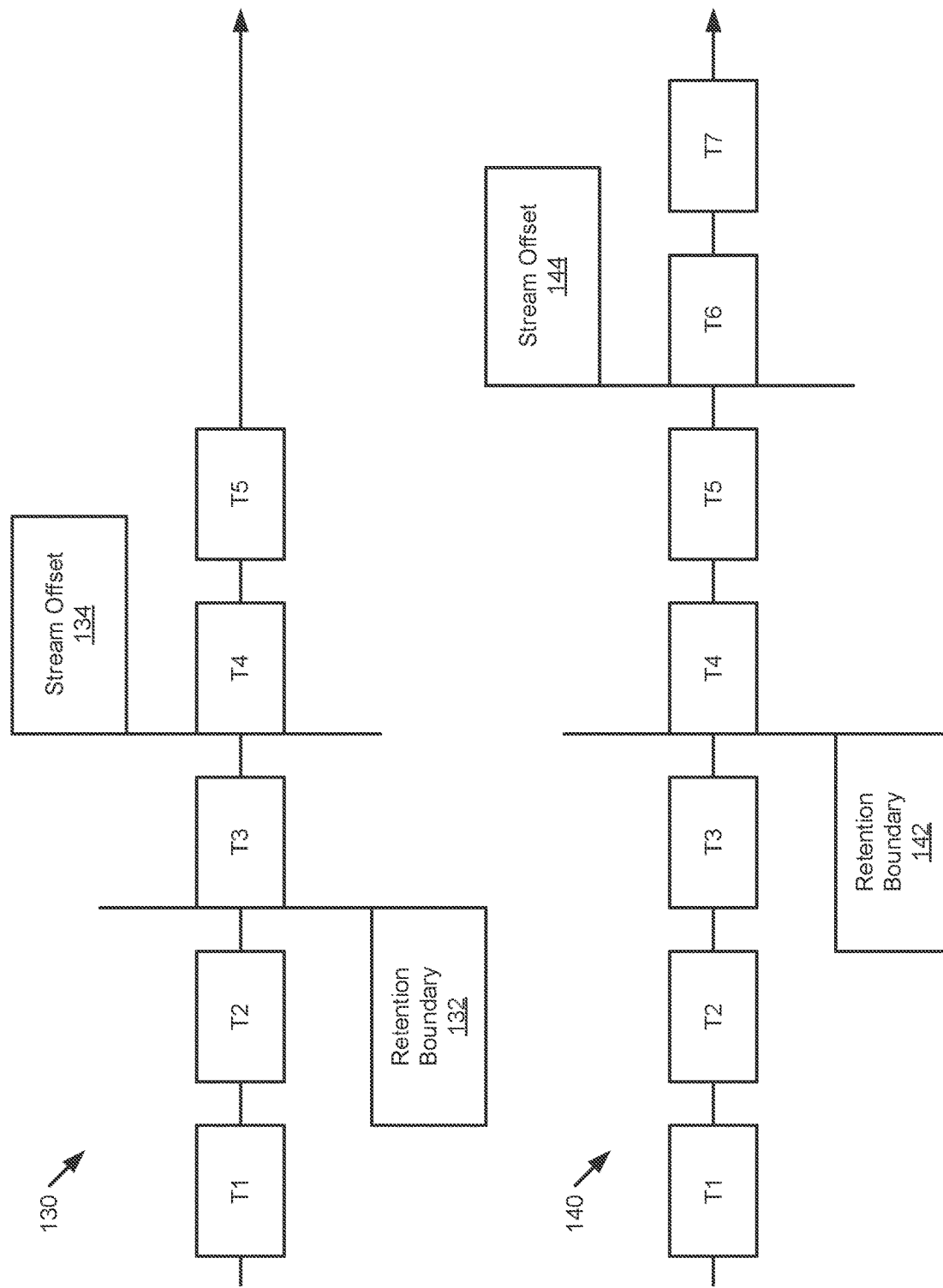
FIG. 1C is a block diagram illustrating transactional timelines for a table, according to one embodiment.

FIG. 1C illustrates a first transactional timeline 130 and a second transactional timeline 140 of a database table. The database table undergoes a series of transactions, including transactions T1, T2, T3, T4, T5, T6, and T7. The change tracking stream 102 maintains a timestamp offset in the transactional timeline 130, 140 of the table. In an embodiment, when the change tracking stream 102 is requested, the changeset interval begins at the last read timestamp and the end interval is the current transactional commit time of the table. In an embodiment, given the retention period for any given table, the retention boundary 132 may be the "earliest" timestamp the stream offset 604 can take. When the change tracking stream 102 is initialized on a table it may select the current transactional timestamp as the offset (i.e. the beginning of the changeset interval which is T4 as illustrated in the first transactional timeline 130). The changeset of rows returned form the change tracking stream 102 in this case is the delta information generated by the transactions T4 and T5. When the stream offset 144 is advanced to T6 as the second transactional timeline 140, the retention boundary 142 and the stream offset 144 are shifted such that reading the changeset will return the deltas produced by transactions T6 and T7.

In an embodiment, the change tracking stream 102 may be available as a system table valued function with arguments such as the table name, the start timestamp, and optionally end transactional time values of the changeset interval. The stream offset 134, 144 of the change tracking stream 102 may be transactionally saved to allow for independent stream processing. The change tracking stream 102 may be a first-class schema object that is linked to an underlying table object and supports transactional manipulation of the offset it maintains. In an embodiment, the change tracking stream 102 includes the same columns as the table it is generated upon, including additional METADATA$ACTION and METADATA$ISUPDATE columns that indicate the action (i.e. insert or delete), and whether this was part of an update for the rows returned when queried out of the stream, respectively.

In an embodiment, when the change tracking stream 102 is generated on a table it will initialize the offset to the current table version. The change tracking stream 102 will support SELECT operations similar to tables and views but may not support explicit DML operations in some embodiments. A query may be run on the change tracking stream 102 to return a set of modifications from a current stream offset up to the current transactional time of the source table. When used in an auto commit statement, the change tracking stream 102 may automatically advance the internal stream offset to the transactional time the query was run (if the query or transaction did not fail). When run in an explicit multi-statement transaction, the change tracking stream 102 may select the transaction time of the start time of the transactions as the upper bound for the transactional interval of changes to be returned starting with the offset as the lower bound. The change tracking stream 102 will not advance the stream offset until a transaction is fully committed, meaning that multiple statements may retrieve the changeset from the change tracking stream 102. Because the upper bound may be set by the transactional start time if DML statements modify tables, inside the transaction the modifications will not reflect in the changeset retrieved from the change tracking stream 102.

FIGS. 2-4 illustrate exemplary embodiments of delete, insert, and update commands that may be executed on a database table. It should be appreciated that the table schemas illustrated in FIGS. 2-4 are illustrative and include simple values to represent rows and columns that may be included in a database table.

FIG. 2 illustrates a block diagram of an example delete command 200 and a resulting delta 210 that may be returned after the delete command 200 is complete. Micro-partition 2 (MP2) as illustrated in FIG. 2 includes four columns. Column 1 includes entries for row numbers that are primarily used for identification purposes. Column 2 includes entries for row values that may include any value depending on the subject or purpose of the database table. The metadata name column includes table history information about which micro-partition the data originated from or was last located within. The metadata row column includes table history information about which row the data originated from or was located within.

As illustrated in FIG. 2, the delete command 200 is performed on MP2 and deletes rows 2 and 3 from MP2 to generate the new MP4. As an example, as illustrated in FIG. 2, MP2 includes four rows—namely rows 1, 2, 3, and 4. It should be appreciated that a micro-partition may include any number of rows and may often include thousands of rows in a single micro-partition. The values for each of the rows in MP2 are listed as value1, value2, value3, and value4 for the four rows by way of example but it should be appreciated the value may include any suitable value as pertinent to the database. In the original and unmodified MP2, the metadata name for each of the four rows is "NULL (MP2)" indicating the data is original to that micro-partition and does not yet have any change history. Similarly, the metadata row column for MP2 is NULL and indicates the original row number because the data is original to MP2 and does not yet have a change tracking history.

MP4 is generated based on the delete command 200 performed on MP2 that deleted rows 2 and 3 as illustrated in FIG. 2. MP4 now only includes rows 1 and 4 having values value1 and value4, respectively. The metadata name for each of rows 1 and 4 is "MP2" indicating the row data originated or was last located within MP2. The metadata row for each of rows 1 and 4 is 1 and 4, respectively, indicating where the rows were last located.

A delta 210 may be determined after the delete command 200 is performed on a table. In an embodiment, a timestamp is attached to each transaction that occurs on the table. Attaching the timestamp to the table version enables the system to know when a table was changed by a certain transaction and when a certain change occurred on any of a plurality of rows in the table.

The delta 210 illustrated in FIG. 2 determines a difference or a change that occurred between MP2 and MP4. In various embodiments the delta 210 may determine only the change that has occurred between any two timestamps, even if many transactions have occurred on the data between those two timestamps and the data has been changed multiple times. The delta 210 provides an indication of a total change between two timestamps without providing information on any intermediate changes that occurred between a first timestamp and a second timestamp.

The delta 210 includes four columns, namely a column 1 and column 2 (similar to those shown in MP2 and MP4) along with a metadata action column and a metadata is update column. Column 1 and Column 2 indicate that the values of rows 2 and 3 are 2 and value2 and 3 and value3, respectively. In various embodiments, where the values of rows 2 and 3 may have changed one or more times between the first timestamp and the second timestamp, Column 2 may indicate the original value or the most recent value. The metadata action column indicates that rows 2 and 3 underwent a DELETE command. The metadata is update column indicates whether the metadata was updated. In the delta 210 illustrated in FIG. 2, the metadata is update column returns a FALSE because the rows did not undergo an update (but were instead deleted).

In an embodiment, the change tracking stream 102 represents the changes that have been the result of executing one or more DML statements against the table. The change tracking stream 102 includes a stream of data and is built on top of the computations of the changes between the transaction time points. The change tracking stream 102 is made possible by the table version information and the change tracking information in the metadata columns in the table. The change tracking stream 102 maintains a position in a stream of changes and is advanced when the stream data is consumed by selecting out of the stream using SELECT. The change tracking stream 102 will advance when used in a DML statement inside a transaction when the transaction commits successfully. If the transaction is rolled back or aborts, the position in the change tracking stream 102 is unchanged.

In an embodiment, a delta for the table may be determined by querying the change tracking stream between a first timestamp and a second timestamp. For each given micro-partition, and/or for the table as a whole, a lineage sequence of dependencies may be generated that indicates which rows have been updated, how those rows were updated, and what transaction caused each update. A delta may be determined by requesting a changeset between two timestamps in the lineage. The delta is computed using a listing of all added micro-partitions and all removed micro-partitions between the two timestamps. The listing may be consolidated by removing those micro-partitions that appear on both the list of added micro-partitions and on the list of removed micro-partitions. This may be accomplished by performing an anti-join on the lists of added and removed micro-partitions. The actual changes are generated by doing a full outer join between the rows in the added and deleted micro-partitions on the metadata columns (name and row) to generate the inserted and the deleted rows. When the rows are updated, the information there further augmented by comparing the original table columns to detect changes.

Further in an embodiment, a row granularity list of changes may be determined between any two transaction times for a given table. A side-by-side representation may be generated that may be easily used in a merge statement by checking which part of data is present. A table valued function or a metadata object like a stream object may be utilized to query the table history for a given table (or a materialized view). Further, a SQL statement may be utilized by referring the INSERTED or DELETED columns in a changeset to return an indication of which rows in the table have been inserted or deleted.

In an embodiment, the row granularity list of changes between added and removed micro-partitions is determined. In such an embodiment, a full outer join is performed between a rowset of added micro-partitions and a rowset of removed micro-partitions on a metadata partition and metadata row number columns. When the resulting joined rowset includes NULL values for the metadata columns in the data from the added rowset, this indicates those rows represent DELETEs. If the values for the metadata columns in the data from the inserted rowset are NULL, this indicates those rows represent INSERTs. If the metadata columns originating from the added and removed rowsets are both NULL, this indicates the rows were potentially updated, and comparing the original data columns will result in the information indicating whether the rows were actually modified.

FIG. 3 illustrates a block diagram of an example insert command 300 and a resulting delta 310 that may be returned after the insert command 300 is complete. FIG. 3 begins with an exemplary micro-partition 3 (MP3) that undergoes an insert command 300 to generate micro-partition 5 (MP5). The insert command 300 inserts rows 17 and 18 into MP3. As an example, embodiment, MP3 includes three rows, namely rows 21, 22, and 23 having values of value21, value22, and value23, respectively. The metadata name for is NULL (MP3) for each of the three rows because there is not yet a change tracking history for the rows that indicates where the rows originated or were last stored. The NULL (VALUE) notation indicates that the values for the metadata columns are NULL when rows are first inserted into the table but the columns have an implicit VALUE which is used when the row is copied into a new partition. The NULL values can reduce overhead. When values for a row are copied into a new micro-partition, the rank of the row is notated in the NULL(ROW NUMBER) notation. In such an implementation, the NULL(ROW NUMBER) notation for the first row is 1, the second row is 2, the third row is 3, and so forth.

MP5 is generated based on the insert command 300 and now includes rows 17 and 18. The values for rows 17 and 18 are value17 and value 18, respectively, because rows 17 and 18 were inserted into MP5 and those are the assigned values for the rows. The values for rows 21, 22, and 23 have not changed. The metadata name information for rows 21, 22, and 23 is "MP3" because the data originated from or was last stored in micro-partition 3. The metadata row information for rows 21, 22, and 23 is 1, 2, and 3, respectively, because rows 21, 22, and 23 were originally or last stored in rows 1, 2, and 3 in micro-partition 3. The metadata name information and the metadata row information for rows 17 and 18 is "NULL" because the rows originated in MP5 and do not yet have any change tracking history information.

The delta 310 for the insert command 300 illustrates the total change made between a first timestamp and a second timestamp. As illustrated in FIG. 2, the delta 310 illustrates the change that occurred between MP5 and MP3. It should be appreciated that in alternative embodiments or implementations, a delta may indicate a total change or modification that occurred on a table between any two timestamps without indicating incremental changes that occurred on the table.

The delta 310 includes rows 17 and 18 having value17 and value18, respectively because rows 17 and 18 were added to MP3 because of the insert command 300. The metadata action is "INSERT" for rows 17 and 18 because an insert command 300 was the transaction that caused a modification to the rows. The metadata is update information is "FALSE" for rows 17 and 18 because the rows were not updated but were instead inserted.

FIG. 4 illustrates a block diagram of an example update command 400 and a resulting delta 410 that may be returned after the update command 400 is complete. In the example embodiment illustrated in FIG. 4, micro-partition 78 (MP78) is updated to generate micro-partition 91 (MP91). The update command 400 updates rows 1 and 4 to new values. MP78 includes rows 1, 2, 3, and 4 having values of value1, value2, value3, and value4, respectively. The metadata name information is "NULL (MP78) for each of the rows because there is not yet change tracking history for the rows indicating where the rows were last stored. The metadata row information for each of the rows is NULL because there is not yet change tracking history for the rows indicating which row the values were last stored.

MP91 includes rows 1, 2, 3, and 4. However, due to the update command 400, row 1 now has a value of VALUE11 and row 4 now has a value of VALUE44. The metadata name information for each of rows 1, 2, 3, and 4 is "MP78" because the values originated from or were last stored in MP78. The metadata row information for rows 1 is "1" because that value was last stored in row 1 in MP78. Similarly, for rows 2, 3, and 4, the metadata row information is "2", "3", and "4", respectively. When rows 1, 2, 3, and 4 were copied over to the new MP91 the ordinal position (also referred to as "rank") of the rows was also copied over from the original MP78.

The delta 410 indicates the change between a first timestamp and a second timestamp. As illustrated in FIG. 4, the delta 410 indicates a total change between MP78 and MP91 due to the update command 400. The delta 410 indicates that rows 1 and 4 that had a value of "value1" and "value2", respectively, were deleted. The delta 410 indicates that rows 1 and 4 that have a value of "VALUE11" and "VALUE44", respectively, were inserted. The metadata is update information is "TRUE" for all rows because an update command 400 was performed on the rows. As indicated in the delta 410, when an update command is performed, the original row is deleted, and a new row is inserted to carry out the command.

In an embodiment, a change tracking entry is generated after complete execution of a transaction against the database. The change tracking entry may include a delta summary that indicates how the table was modified since the last transaction. The deltas 210, 310, and 410 as illustrated in FIGS. 2, 3, and 4 illustrate exemplary delta summaries that may be included in a change tracking entry.

Figure 5:
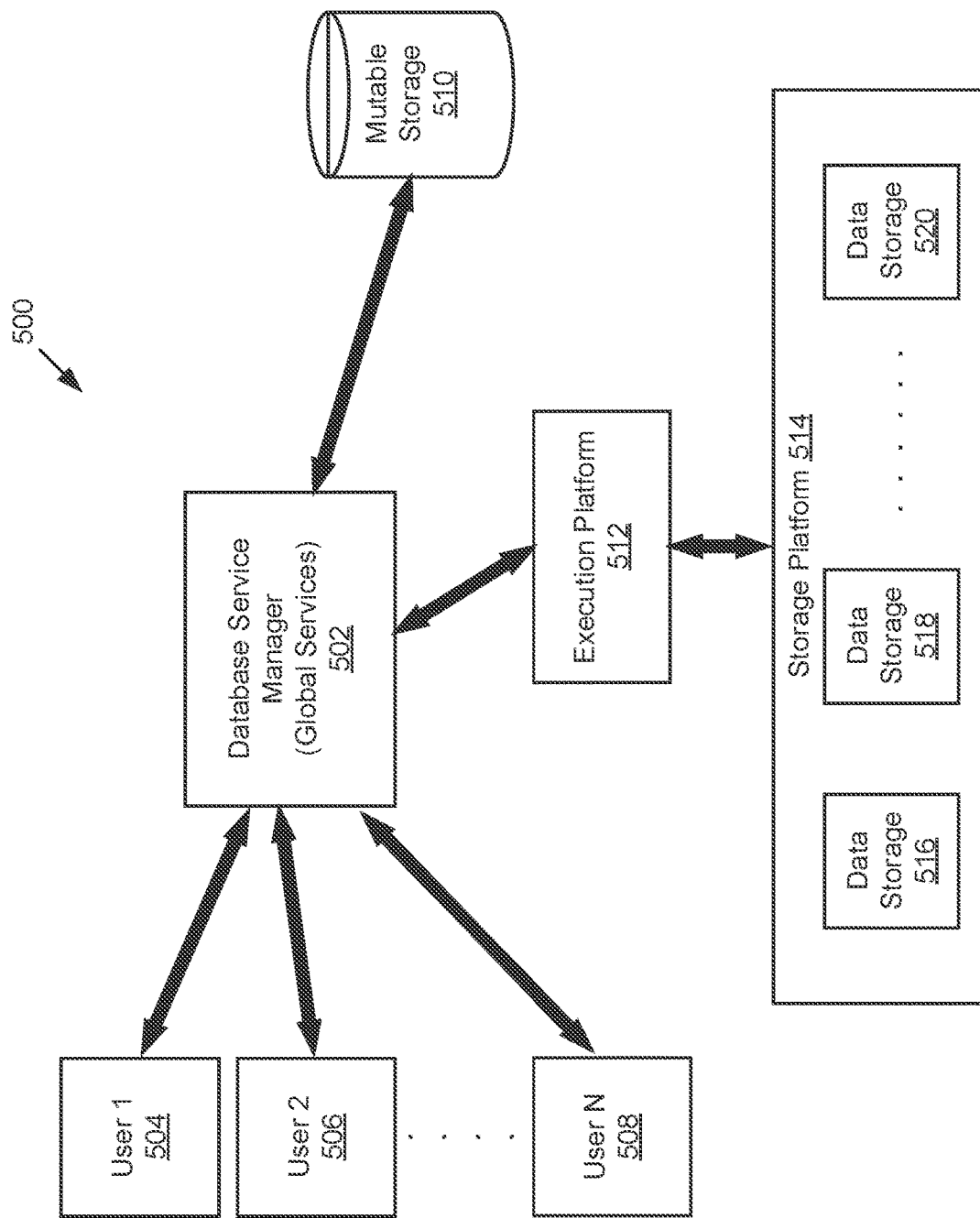
FIG. 5 is a block diagram illustrating a database system having a database service manager, according to one embodiment.

Turning to FIG. 5, a block diagram is shown illustrating a processing platform 500 for providing database services, according to one embodiment. The processing platform 500 includes a database service manager 502 that is accessible by multiple users 504, 506, and 508. The database service manager 502 may also be referred to herein as a resource manager or global services. In some implementations, database service manager 502 can support any number of users desiring access to data or services of the processing platform 500. Users 504-508 may include, for example, end users providing data storage and retrieval queries and requests, system administrators managing the systems and methods described herein, software applications that interact with a database, and other components/devices that interact with database service manager 502. In a particular embodiment as illustrated herein, the users 504-508 may initiate changes to database data and may request a delta for a database table. The database service manager 502 may receive, for example, DML commands from one or more users 504-508 and then initiate the execution of transactions on the database data by way of the execution platform 512. Such transaction may further lead to the generation of a change tracking stream as disclosed herein.

The database service manager 502 may provide various services and functions that support the operation of the systems and components within the processing platform 500. Database service manager 502 has access to stored metadata associated with the data stored throughout data processing platform 500. The database service manager 502 may use the metadata for optimizing user queries. In some embodiments, metadata includes a summary of data stored in remote data storage systems as well as data available from a local cache (e.g., a cache within one or more of the clusters of the execution platform 512). Additionally, metadata may include information regarding how data is organized in the remote data storage systems and the local caches. Metadata allows systems and services to determine whether a piece of data needs to be processed without loading or accessing the actual data from a storage device.

As part of the data processing platform 500, metadata may be collected when changes are made to the data using a data manipulation language (DML), which changes may be made by way of any DML statement. Examples of manipulating data may include, but are not limited to, selecting, updating, changing, merging, and inserting data into tables. As part of the processing platform 500, micro-partitions may be created, and the metadata may be collected on a per file and a per column basis. This collection of metadata may be performed during data ingestion or the collection of metadata may be performed as a separate process after the data is ingested or loaded. In an implementation, the metadata may include a number of distinct values; a number of null values; and a minimum value and a maximum value for each file. In an implementation, the metadata may further include string length information and ranges of characters in strings.

In one embodiment, at least a portion of the metadata is stored in immutable storage such as a micro-partition. For example, the metadata may be stored on the storage platform 514 along with table data. In one embodiment, the same or separate cloud storage resources that are used for table data may be allocated and used for the metadata. In one embodiment, the metadata may be stored in local immutable storage. In one embodiment, information about the metadata in immutable storage, or information about metadata files stored in immutable storage, is stored in mutable storage 510. The information about metadata may be referenced for locating and accessing the metadata stored in immutable storage. In one embodiment, systems with metadata storage may be restructured such that the metadata storage is used instead to store information about metadata files located in immutable storage.

Database service manager 502 is further in communication with an execution platform 512, which provides computing resources that execute various data storage and data retrieval operations. The execution platform 512 may include one or more compute clusters. The execution platform 512 is in communication with one or more data storage devices 516, 518, and 520 that are part of a storage platform 514. Although three data storage devices 516, 518, and 520 are shown in FIG. 5, the execution platform 512 is capable of communicating with any number of data storage devices. In some embodiments, data storage devices 516, 518, and 520 are cloud-based storage devices located in one or more geographic locations. For example, data storage devices 516, 518, and 520 may be part of a public cloud infrastructure or a private cloud infrastructure, or any other manner of distributed storage system. Data storage devices 516, 518, and 520 may include hard disk drives (HDDs), solid state drives (SSDs), storage clusters, or any other data storage technology. Additionally, the storage platform 514 may include a distributed file system (such as Hadoop Distributed File Systems (HDFS), object storage systems, and the like.

In some embodiments, the communication links between database service manager 502 and users 504-508, mutable storage 510 for information about metadata files (i.e., metadata file metadata), and execution platform 512 are implemented via one or more data communication networks and may be assigned various tasks such that user requests can be optimized. Similarly, the communication links between execution platform 512 and data storage devices 516-520 in storage platform 514 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The database service manager 502, mutable storage 510, execution platform 512, and storage platform 514 are shown in FIG. 5 as individual components. However, each of database service manager 502, mutable storage 510, execution platform 512, and storage platform 514 may be implemented as a distributed system (e.g., distributed across multiple systems/platforms at multiple geographic locations) or may be combined into one or more systems. Additionally, each of the database service manager 502, mutable storage 510, the execution platform 512, and the storage platform 514 may be scaled up or down (independently of one another) depending on changes to the requests received from users 504-508 and the changing needs of the data processing platform 500. Thus, in the described embodiments, the data processing platform 500 is dynamic and supports regular changes to meet the current data processing needs.

Figure 6:
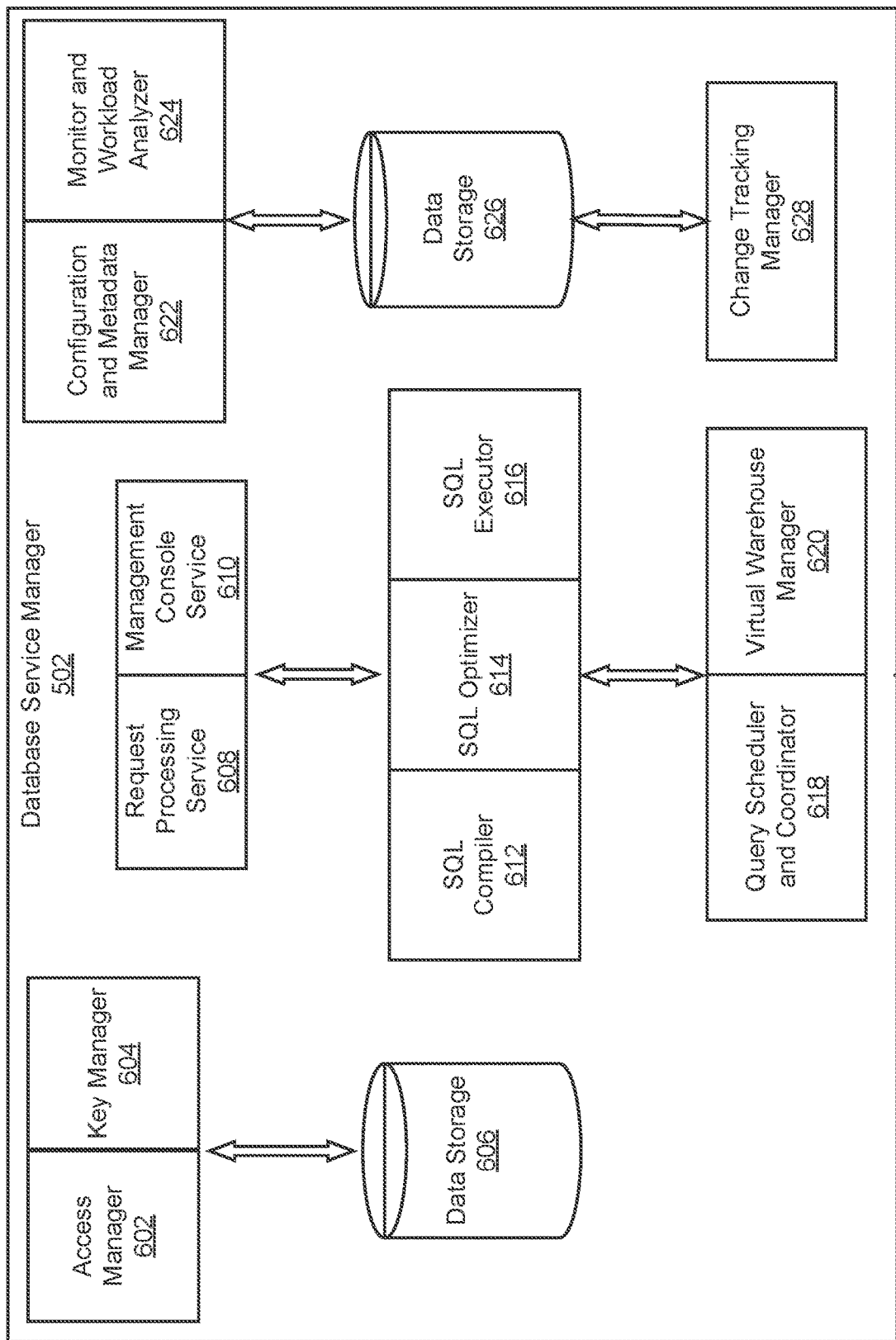
FIG. 6 is a block diagram illustrating components of a database service manager, according to one embodiment.

FIG. 6 illustrates a block diagram depicting components of database service manager 502, according to one embodiment. The database service manager 502 includes an access manager 602 and a key manager 604 coupled to a data storage device 606. The access manager 602 handles authentication and authorization tasks for the systems described herein. The key manager 604 manages storage and authentication of keys used during authentication and authorization tasks. A request processing service 608 manages received data storage requests and data retrieval requests. A management console service 610 supports access to various systems and processes by administrators and other system managers.

The database service manager 502 also includes an SQL compiler 612, an SQL optimizer 614 and an SQL executor 616. SQL compiler 612 parses SQL queries and generates the execution code for the queries. SQL optimizer 614 determines the best method to execute queries based on the data that needs to be processed. SQL executor 616 executes the query code for queries received by database service manager 502. A query scheduler and coordinator 618 sends received queries to the appropriate services or systems for compilation, optimization, and dispatch to an execution platform 612. A virtual warehouse manager 620 manages the operation of multiple virtual warehouses.

Additionally, the database service manager 502 includes a change tracking manager 628, which manages the information related to the data stored in the remote data storage devices and in the local caches. A monitor and workload analyzer 624 oversees the processes performed by the database service manager 502 and manages the distribution of tasks (e.g., workload) across the virtual warehouses and execution nodes in the execution platform 512. Change tracking manager 628 and monitor and workload analyzer 624 are coupled to a data storage device 626. In one embodiment, the configuration and metadata manger 622 collects, stores, and manages metadata in an immutable storage resource. In one embodiment, updates to metadata result in new files and are not updated in place.

Metadata files, as discussed herein, may include files that contain metadata of modifications (e.g., each modification) to any database table in a data warehouse. A modification of a database table may generate one or more metadata files, often just a single metadata file. In one embodiment, metadata files contain the following information: information about a metadata file, including a version number; a list of all added table data files; a list of deleted table data files; and information about each added table data file, including file path, file size, file key id, as well as summaries of all rows and columns that are stored in the table data file.

In one embodiment, the contents of metadata files may vary over time. If format or content of a metadata file changes, the version number of the metadata file may be incremented. In one embodiment, the metadata store (or other mutable data storage resource) only stores information about metadata files (which are stored in immutable storage), not about table data files. In practice, information about metadata files stored in in the metadata store (or other mutable storage) is very limited and may contain data for thousands of metadata files. In one embodiment, information for up to 30,000 metadata files may be stored in metadata store or other mutable storage. This dramatically reduces the amount of storage needed in the metadata store or other mutable storage.

In one embodiment, a system writes metadata files to cloud storage for every modification of a database table (e.g., modification of table data files). In addition to adding and deleting files, every modification to a database table in the data warehouse also generates one or more metadata files. Typically, a modification creates a single metadata file. However, if the modification to the table is large (e.g., an insert into a table that produces very many files), it may result in the creation of multiple metadata files.

The database service manager 502 also includes a change tracking manager 628, which manages the generation of change tracking history such as one or more change tracking entries stored in a change tracking stream as disclosed herein. The change tracking manager 628 further manages the generation of a delta report indicating a total change that has occurred on a database table between a first timestamp and a second timestamp. The change tracking manager 628 further manages the generation of a comprehensive change tracking summary that indicates all incremental modifications that have been to database data between a first timestamp and a second timestamp. Because multiple users/systems may access the same data simultaneously, changes to the data may be synchronized to ensure that each user/system is working with the current version of the data and has access to a change tracking history for the data.

Security improvements are also implemented in some embodiments. In one embodiment, metadata files and change tracking information is encrypted using individual file keys. Within a micro-partition, columns may be encrypted individually using AES-CTR mode with different start counters. This allows a database system to read an individual column from a micro-partition because it can be decrypted without needing to decrypt the whole micro-partition at once. Encryption improves security because nobody can read the micro-partition without having the proper file key.

For verification that a micro-partition has not been altered, the system may store hashes of columns for each column within the micro-partition. Before decrypting the data, the system compares the hash of the encrypted column with the stored hash of the column of this micro-partition. If the hashes do not match, the micro-partition must have been altered. This improves security because all altering of micro-partitions is detected by the database system.

Figure 7:
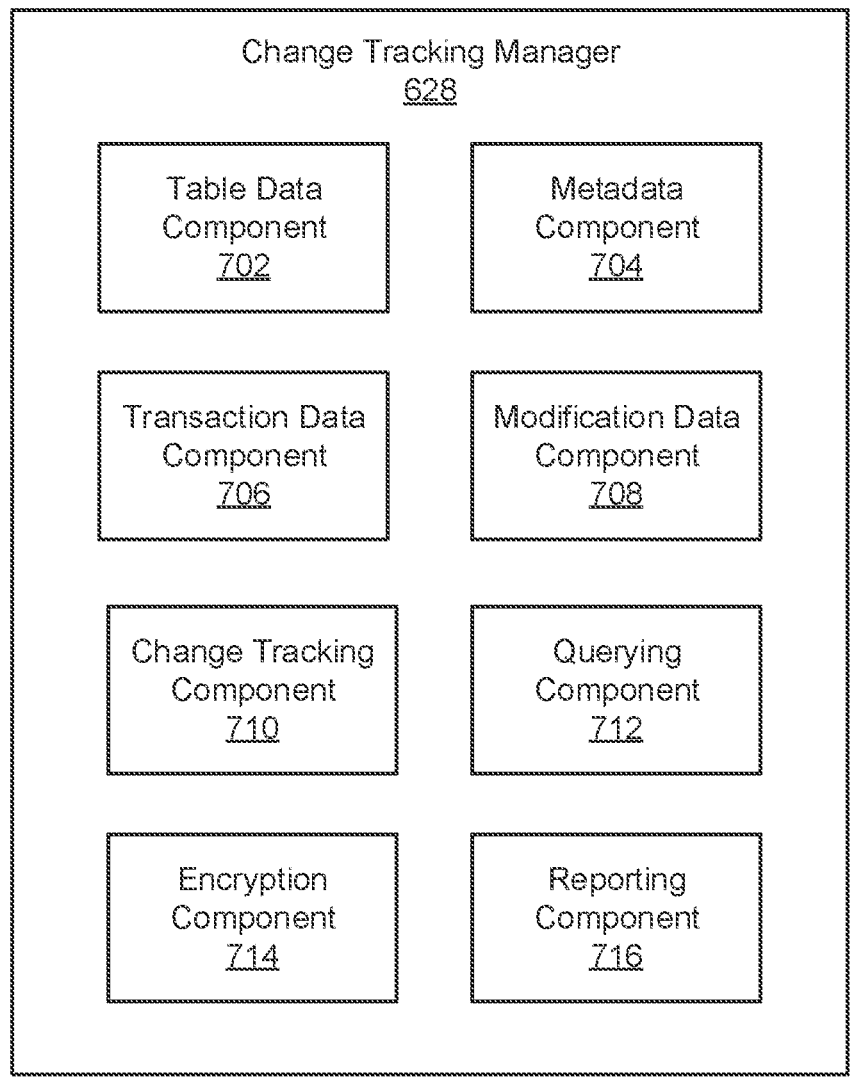
FIG. 7 is a block diagram illustrating components of a change tracking manager, according to one embodiment.

FIG. 7 is a schematic block diagram illustrating components of a change tracking manager 628, according to one embodiment. The change tracking manager 628 may collect, store, and manage metadata about table data files (i.e. micro-partitions) as well as metadata about metadata files. Such metadata includes change tracking information or a table history including a log of changes that have occurred on a table and may be stored as a series of change tracking entries in a change tracking stream. The change tracking manager 628 includes a table data component 702, a metadata component 704, a transaction data component 706, a modification data component 708, a change tracking component 710, a querying component 712, an encryption component 714, and a reporting component 716. The components 702-716 are given by way of illustration only and may not all be included in all embodiments. In fact, some embodiments may include only one or any combination of two or more of the components 702-716. For example, some of the components may be located outside or separate from the change tracking manager 628, such as within a database service manager 502 or processing platform 500. Furthermore, the components 702-716 may comprise hardware, computer readable instructions, or a combination of both to perform the functionality and provide the structures discussed herein.

The table data component 702 stores table data for a database, the table data includes information in rows and columns of one or more database tables. The table data component 702 may store table data in micro-partitions within a storage resource. Example storage resources include cloud storage and/or immutable storage. In one embodiment, the storage resources for storage of table data files may be dynamically allocated to accommodate increases or decreases in storage requirement. The table data component 702 may manage and store table data by causing the data to be stored or updated in a remote resource, such as a cloud storage resource or service.

The metadata component 704 stores metadata on immutable storage such as a micro-partition. The metadata may include information about or describing the table data for the database stored by the table data component 702. In one embodiment, the metadata files may include metadata such as an indication of added or deleted table data files. The metadata may include file information for table data files, the file information including one or more of a file name and a storage location. The metadata may include one or more change tracking entries in a change tracking stream. In one embodiment, the metadata may be stored in files on the same cloud storage resources as the table data. In one embodiment, metadata component 704 may cause the metadata to be stored within metadata files in a column-by-column format in remote cloud storage.

The metadata component 704 may also collect and manage storage of metadata within metadata files on the immutable storage. The metadata component 704 may create, in response to a change in the table data, a new metadata file in the immutable storage without modifying previous metadata files. The new metadata file may include metadata indicating the change in the table data. In one embodiment, the metadata in the new metadata file indicates an addition or a deletion of a table data file comprising the table data. The metadata component 704 may also delete expired metadata files. Expired metadata files may include those older than a specific age and that are not referenced in metadata information stored by the change tracking history component 706.

The transaction data component 706 generates and stores transaction data for each transaction that is executed on a table. Such transaction data may include a change tracking entry to be stored within a change tracking stream that may be stored in a micro-partition in a database table. The transaction data component 706 may associate the transaction data with a new micro-partition such that the transaction data is stored as metadata in the new micro-partition. Such transaction data may include, for example, an identity of a user or account that initiated a DML or SQL statement, when the transaction was requested, when the transaction was initiated, when the transaction was completed, how the transaction impacted the table, what rows and/or micro-partitions were modified by the transaction, and so forth.

The change tracking component 710 determines and stores a lineage of modifications made to a table. The lineage of modifications may be stored in the form of a plurality of change tracking entries stored in a change tracking stream. The lineage may be stored in local mutable storage and/or within the table data such as a change tracking column, for example. The lineage may include joined data or modification data. The lineage may be queried to determine either of a delta indicating a net change between a first timestamp and a second timestamp and/or a comprehensive change tracking summary indicating all changes that occurred on the table between the first timestamp and the second timestamp.

The querying component 712 may run a query to determine what rows and/or micro-partitions in a table have been changed and further determine what transactions caused each change to the table. The querying component may run the query on the change tracking stream to determine a comprehensive change tracking summary for the table and/or a delta for the table between a first timestamp and a second timestamp. The querying component 712 may be utilized to greatly reduce the cost for determining modifications that have been executed on a table by negating the need to determine a change between a plurality of sequential pairs of table versions.

The encryption component 714 is configured to encrypt table data and metadata. In one embodiment, the encryption component 714 encrypts the metadata column-by-column to allow for independent decryption and reading of metadata for a specific column.

The reporting component 716 generates a report based on data determined by the querying component 712. The report may include a comprehensive summary of all transactions that have been executed on a table, and how those transaction modified the time, between two timestamps. The report may further include, for example, an indication of when each of the transactions and/or intermediate modifications to the table occurred, an indication of what transactions caused each intermediate modification on the table, an indication of what rows of the table were modified by what transaction, an indication of what user account initiated a transaction that caused a modification on the table, and so forth.

Figure 8:
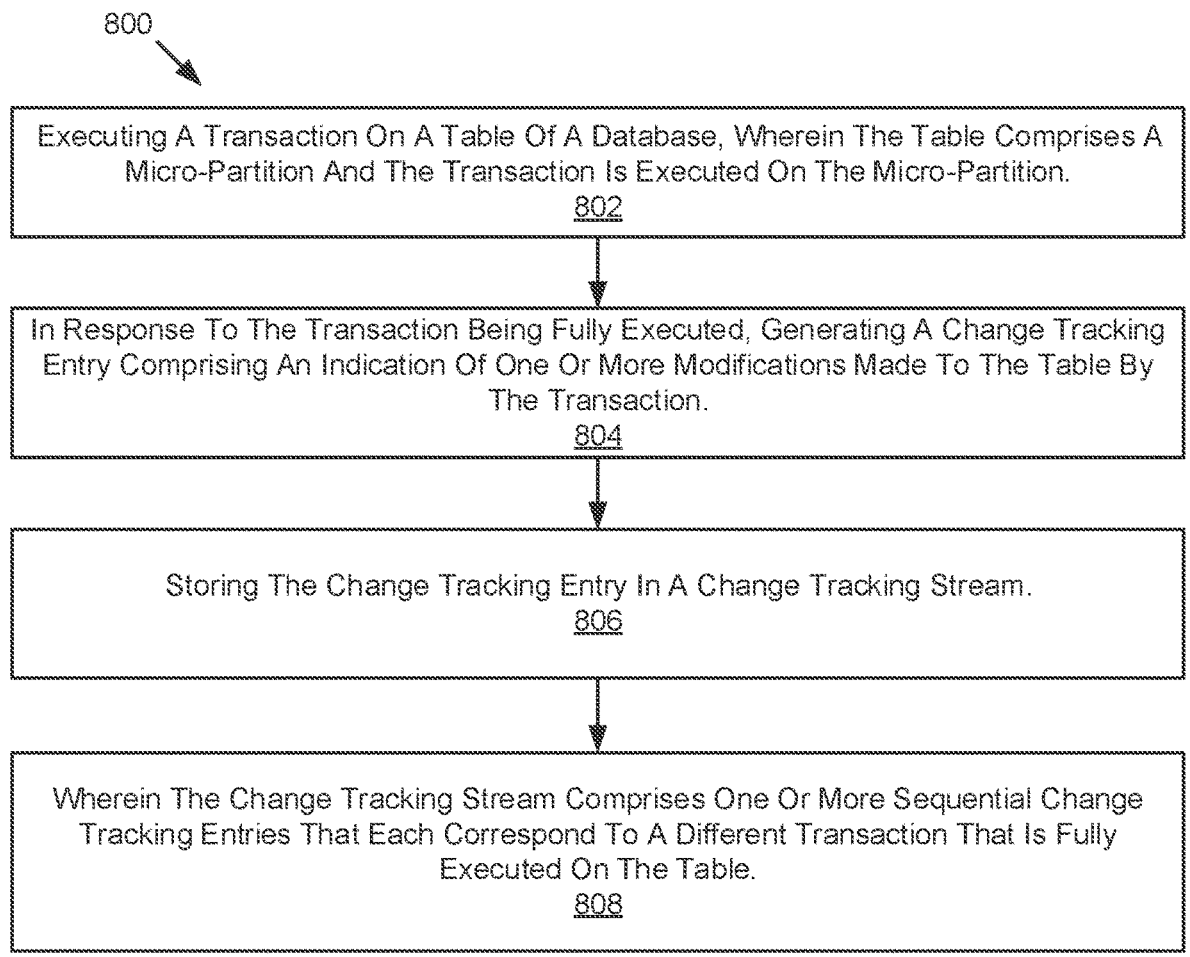
FIG. 8 is a schematic flow chart diagram illustrating a method for generating a transactional change tracking stream, according to one embodiment.

FIG. 8 is a schematic flow chart diagram illustrating an example method 800 for generating a transactional change tracking stream for a database table. The method 800 may be performed by a change tracking manager 628, database service manager 502, processing platform 500, and/or other service or platform.

The method 800 begins and a computing device executes at 802 a transaction on a table of a database, wherein the table comprises a micro-partition and the transaction is executed on the micro-partition. The method 800 continues and the computing device, in response to the transaction being fully executed, generating at 804 a change tracking entry comprising an indication of one or more modifications made to the table by the transaction. The method 800 continues and the computing device stores at 806 the change tracking entry in a change tracking stream, wherein (see 808) the change tracking stream comprises one or more sequential change tracking entries that each correspond to a different transaction that is fully executed on the table.

Figure 9:
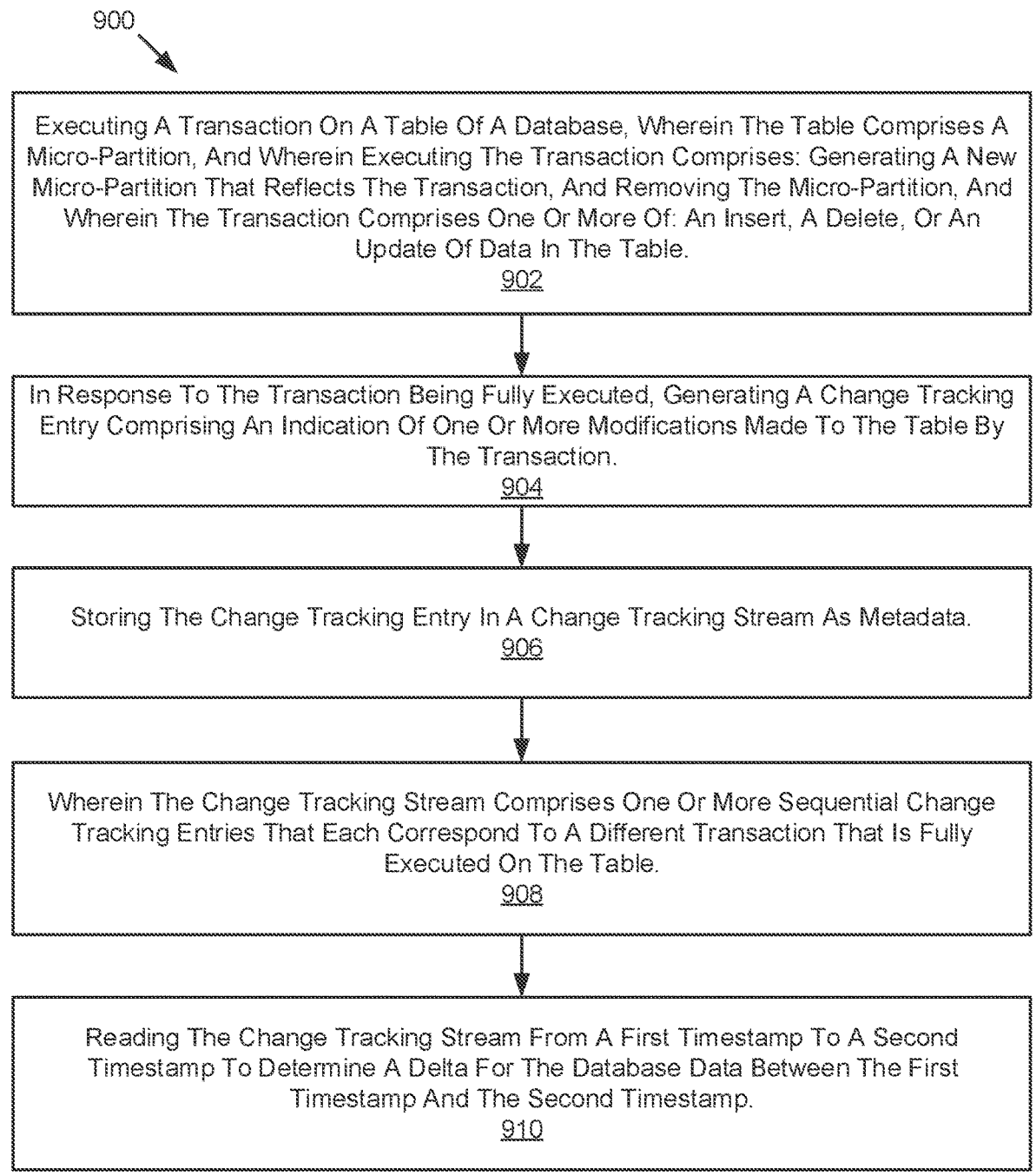
FIG. 9 is a schematic flow chart diagram illustrating a method for generating a transactional change tracking stream, according to one embodiment.

FIG. 9 is a schematic flow chart diagram illustrating an example method 900 for generating a transactional change tracking stream for a database table. The method 900 may be performed by a change tracking manager 628, database service manager 502, processing platform 500, and/or other service or platform.

The method 900 begins and a computing device executes at 902 a transaction on a table of a database, wherein the table comprises a micro-partition, and wherein executing the transaction comprises: generating a new micro-partition that reflects the transaction, and removing the micro-partition, and wherein the transaction comprises one or more of: an insert, a delete, or an update of data in the table. The method 900 continues and a computing device, in response to the transaction being fully executed, generating at 904 a change tracking entry comprising an indication of one or more modifications made to the table by the transaction. The method 900 continues and the computing device stores at 906 the change tracking entry in a change tracking stream as metadata, wherein (see 908) the change tracking stream comprises one or more sequential change tracking entries that each correspond to a different transaction that is fully executed on the table. The method 900 continues and the computing device reads at 910 the change tracking stream from a first timestamp of the change tracking stream to a second timestamp of the change tracking stream to determine a delta for the database data between the first timestamp of the change tracking stream and the second timestamp of the change tracking stream.

Figure 10:
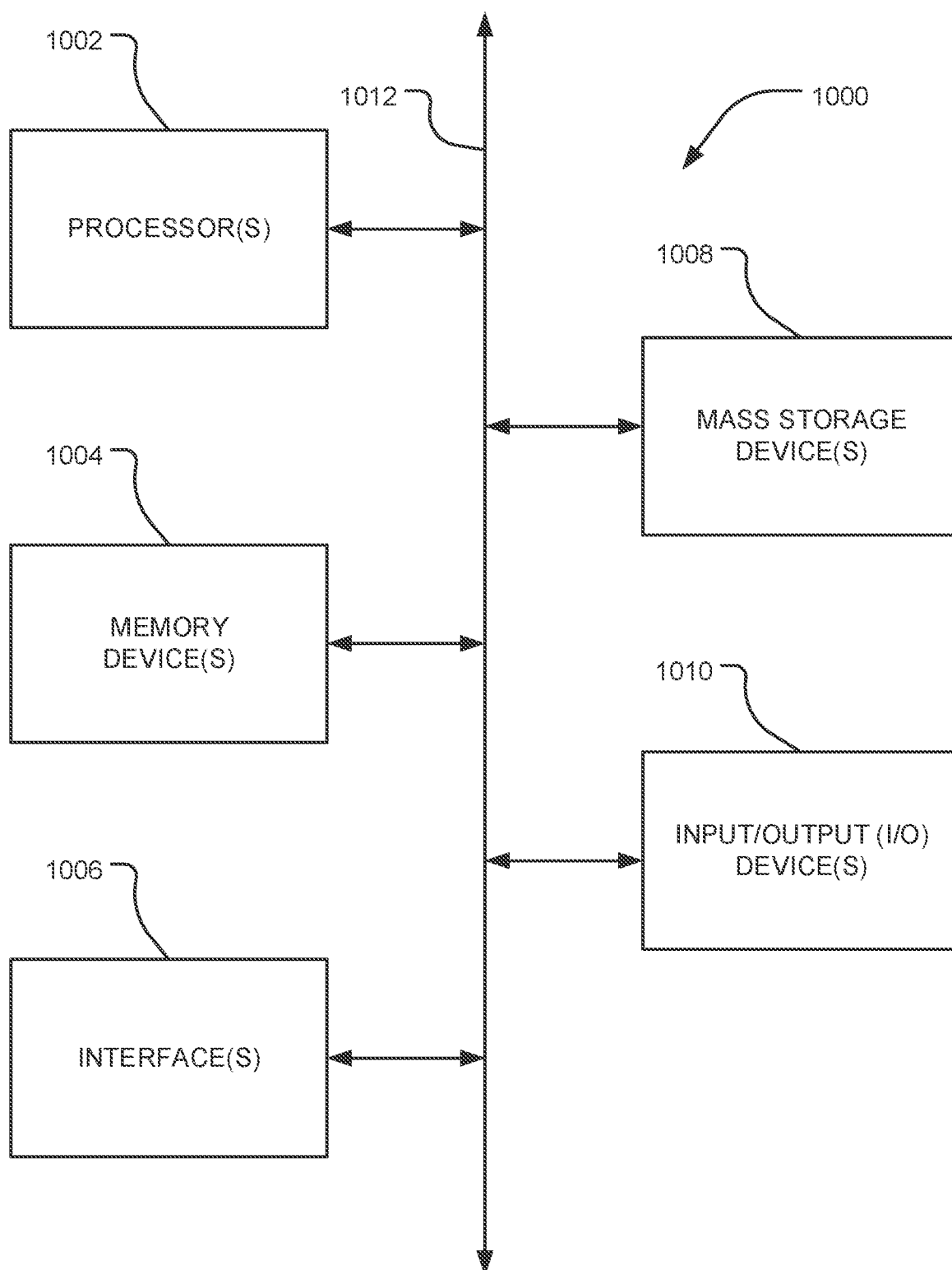
FIG. 10 is a block diagram depicting an example computing device consistent with at least one embodiment of processes and systems disclosed herein.

FIG. 10 is a block diagram depicting an example computing device 1000. In some embodiments, computing device 1000 is used to implement one or more of the systems and components discussed herein. For example, computing device 1000 may include or be part of a change tracking manager 628, a database service manager 502, a processing platform 500, and/or any other components or systems discussed herein. As another example, the components, systems, or platforms discussed herein may include one or more computing devices 1000. Further, computing device 1000 may interact with any of the systems and components described herein. Accordingly, computing device 1000 may be used to perform various procedures and tasks, such as those discussed herein. Computing device 1000 can function as a server, a client or any other computing entity. Computing device 1000 can be any of a wide variety of computing devices, such as a desktop computer, a notebook computer, a server computer, a handheld computer, a tablet, and the like.

Computing device 1000 includes one or more processor(s) 1002, one or more memory device(s) 1004, one or more interface(s) 1006, one or more mass storage device(s) 1008, and one or more Input/Output (I/O) device(s) 1010, all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM)) and/or nonvolatile memory (e.g., read-only memory (ROM)). Memory device(s) 1004 may also include rewritable ROM, such as Flash memory.

Mass storage device(s) 1008 include various computer readable media, such as magnetic tapes, magnetic disks, optical disks, solid state memory (e.g., Flash memory), and so forth. Various drives may also be included in mass storage device(s) 1008 to enable reading from and/or writing to the various computer readable media. Mass storage device(s) 1008 include removable media and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Interface(s) 1006 include various interfaces that allow computing device 1000 to interact with other systems, devices, or computing environments. Example interface(s) 1006 include any number of different network interfaces, such as interfaces to local area networks (LANs), wide area networks (WANs), wireless networks, and the Internet.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, USB bus, and so forth.

EXAMPLES

The following examples pertain to further embodiments.

Example 1 is a method for generating a transactional change tracking stream. The method includes executing a transaction on a table of a database, wherein the table comprises a micro-partition and the transaction is executed on the micro-partition. The method includes, in response to the transaction being fully executed, generating a change tracking entry comprising an indication of one or modifications made to the table by the transaction. The method includes storing the change tracking entry in a change tracking stream, wherein the change tracking stream comprises one or more sequential change tracking entries that each correspond to a different transaction that is fully executed on the table.

Example 2 is a method as in Example 1, wherein executing the transaction on the micro-partition comprises generating a new micro-partition that reflects the transaction and removing the micro-partition, wherein the transaction comprises one or more of: an insert, a delete, an update, or a merge of database data.

Example 3 is a method as in any of Examples 1-2, wherein the table comprises a plurality of micro-partitions and the transaction is executed on one or more of the plurality of micro-partitions.

Example 4 is a method as in any of Examples 1-3, wherein the change tracking entry further comprises one or more of: a timestamp when the transaction was requested, a timestamp when the transaction was fully executed, an identifier of a user or account that requested the transaction, or a minimum and maximum of data values inserted by the transaction.

Example 5 is a method as in any of Examples 1-4, wherein generating the change tracking entry comprises generating one or more change tracking entries for each of one or more micro-partitions of the table that are modified by the transaction.

Example 6 is a method as in any of Examples 1-5, wherein each of the one or more change tracking entries is stored as metadata in an applicable micro-partition of the one or more micro-partitions.

Example 7 is a method as in any of Examples 1-6, wherein the change tracking stream comprises a change tracking micro-partition that is stored within the table as metadata, and wherein the change tracking micro-partition is separate from one or more micro-partitions of the table that comprise database data.

Example 8 is a method as in any of Examples 1-7, wherein each of the one or more sequential change tracking entries in the change tracking stream comprises a timestamp when a corresponding transaction was executed, and wherein the method further comprises reading the change tracking stream from a first timestamp to a second timestamp to determine a delta for the database data between the first timestamp and the second timestamp.

Example 9 is a method as in any of Examples 1-8, wherein the first timestamp indicates a most recent time the change tracking stream was read and the second timestamp indicates a present time, and wherein the delta for the database data between the first timestamp and the second timestamp indicates one or more modifications made to the table since the most recent time the change tracking stream was read.

Example 10 is a method as in any of Examples 1-9, wherein each of the one or more sequential change tracking entries in the change tracking stream comprises a timestamp when a corresponding transaction was executed, and wherein the method further comprises reading the change tracking stream to determine a comprehensive change tracking summary between a first timestamp and a second timestamp, wherein the comprehensive change tracking summary comprises an indication of all incremental modifications made to the table between the first timestamp and the second timestamp.

Example 11 is a system for generating a transactional change tracking stream. The system includes means for executing a transaction on a table of a database, wherein the table comprises a micro-partition and the transaction is executed on the micro-partition. The system includes means for generating a change tracking entry in response to the transaction being fully executed, wherein the change tracking entry comprises an indication of one or modifications made to the table by the transaction. The system includes means for storing the change tracking entry in a change tracking stream, wherein the change tracking stream comprises one or more sequential change tracking entries that each correspond to a different transaction that is fully executed on the table.

Example 12 is a system as in Example 11, wherein the means for executing the transaction on the micro-partition is configured to generate a new micro-partition that reflects the transaction and remove the micro-partition, wherein the transaction comprises one or more of: an insert, a delete, an update, or a merge of database data.

Example 13 is a system as in any of Examples 11-12, wherein the table comprises a plurality of micro-partitions and the transaction is executed on one or more of the plurality of micro-partitions.

Example 14 is a system as in any of Examples 11-13, wherein the change tracking entry further comprises one or more of: a timestamp when the transaction was requested, a timestamp when the transaction was fully executed, an identifier of a user or account that requested the transaction, or a minimum and maximum of data values inserted by the transaction.

Example 15 is a system as in any of Examples 11-14, wherein the means for generating the change tracking entry is configured to generate one or more change tracking entries for each of one or more micro-partitions of the table that are modified by the transaction, and wherein each of the one or more change tracking entries is stored as metadata in an applicable micro-partition of the one or more micro-partitions.

Example 16 is a system as in any of Examples 11-15, wherein the change tracking stream comprises a change tracking micro-partition that is stored within the table as metadata, and wherein the change tracking micro-partition is separate from one or more micro-partitions of the table that comprise database data.

Example 17 is a system as in any of Examples 11-16, wherein each of the one or more sequential change tracking entries in the change tracking stream comprises a timestamp when a corresponding transaction was executed, and wherein the system further comprises means for reading the change tracking stream from a first timestamp to a second timestamp to determine a delta for the database data between the first timestamp and the second timestamp.

Example 18 is a system as in any of Examples 11-17, wherein the first timestamp indicates a most recent time the change tracking stream was read and the second timestamp indicates a present time, and wherein the delta for the database data between the first timestamp and the second timestamp indicates one or more modifications made to the table since the most recent time the change tracking stream was read.

Example 19 is a system as in any of Examples 11-18, wherein each of the one or more sequential change tracking entries in the change tracking stream comprises a timestamp when a corresponding transaction was executed, and wherein the system further comprises means for reading the change tracking stream to determine a comprehensive change tracking summary between a first timestamp and a second timestamp, wherein the comprehensive change tracking summary comprises an indication of all incremental modifications made to the table between the first timestamp and the second timestamp.

Example 20 is non-transitory computer readable storage media storing instructions that, when executed by one or more processors, cause the one or more processors to: execute a transaction on a table of a database, wherein the table comprises a micro-partition and the transaction is executed on the micro-partition; in response to the transaction being fully executed, generate a change tracking entry comprising an indication of one or more modifications made to the table by the transaction; and store the change tracking entry in a change tracking stream; wherein the change tracking stream comprises one or more sequential change tracking entries that each correspond to a different transaction that is fully executed on the table.

Example 21 is non-transitory computer readable storage media as in Example 20, wherein the instructions cause the one or more processors to execute the transaction on the micro-partition by generating a new micro-partition that reflects the transaction and removing the micro-partition, wherein the transaction comprises one or more of: an insert, a delete, an update, or a merge of database data.

Example 22 is non-transitory computer readable storage media as in any of Examples 20-21, wherein the change tracking entry further comprises one or more of: a timestamp when the transaction was requested; a timestamp when the transaction was fully executed; an identifier of a user or account that requested the transaction; or a minimum and maximum of data values inserted by the transaction.

Example 23 is non-transitory computer readable storage media as in any of Examples 20-22, wherein the instructions cause the one or more processors to generate the change tracking entry by generating one or more change tracking entries for each of one or more micro-partitions of the table that are modified by the transaction, and wherein each of the one or more change tracking entries is stored as metadata in an applicable micro-partition of the one or more micro-partitions.

Example 24 is non-transitory computer readable storage media as in any of Examples 20-23, wherein the change tracking stream comprises a change tracking micro-partition that is stored within the table as metadata, and wherein the change tracking micro-partition is separate from one or more micro-partitions of the table that comprise database data.

Example 25 is non-transitory computer readable storage media as in any of Examples 20-24, wherein each of the one or more sequential change tracking entries in the change tracking stream comprises a timestamp when a corresponding transaction was executed, and wherein the instructions further cause the one or more processors to read the change tracking stream from a first timestamp to a second timestamp to determine a delta for the database data between the first timestamp and the second timestamp.

Example 26 is non-transitory computer readable storage media as in any of Examples 20-25, wherein each of the one or more sequential change tracking entries in the change tracking stream comprises a timestamp when a corresponding transaction was executed, and wherein the instructions further cause the one or more processors to read the change tracking stream to determine a comprehensive change tracking summary between a first timestamp and a second timestamp, wherein the comprehensive change tracking summary comprises an indication of all incremental modifications made to the table between the first timestamp and the second timestamp.

Example 27 is an apparatus including means to perform a method as in any of Examples 1-10.

Example 28 is a machine-readable storage media including machine-readable instructions that, when executed, implement a method or realize an apparatus of any of Examples 1-10.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large-scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components and may be embodied in any suitable form and organized within any suitable type of data structure. The operational data may be collected as a single data set or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method comprising:
   generating a micro-partition based on execution of a transaction on a table of a database, the micro-partition reflecting changes made to the table by the transaction;
   generating a change tracking entry in response to the execution of the transaction, the change tracking entry comprising an indication of one or more modifications made to the table by the transaction and an indication of the micro-partition generated based on the execution of the transaction;
   storing the change tracking entry in the micro-partition as metadata; and
   responsive to storing the change tracking entry, removing at least one existing micro-partition from the table.

2. The method of claim 1, wherein the transaction comprises one or more of an insert, a delete, an update, and a merge of database data.

3. The method of claim 1, wherein the table comprises a plurality of immutable micro-partitions, and the transaction is executed on one or more micro-partitions of the plurality of immutable micro-partitions.

4. The method of claim 3, wherein generating the change tracking entry comprises:
   generating one or more change tracking entries corresponding to each of the one or more micro-partitions of the table that are impacted by the transaction.

5. The method of claim 3, wherein the micro-partition having the change tracking entry is separate from the one or more micro-partitions of the table.

6. The method of claim 1, wherein the change tracking entry further comprises one or more of:
   a timestamp indicating when the transaction was requested;
   an identifier of a user that requested the transaction;
   an identifier of an account that requested the transaction; and
   a minimum and maximum of data values inserted by the transaction.

7. The method of claim 1, further comprising:
   entering the change tracking entry into a change tracking stream, the change tracking stream comprising one or more sequential change tracking entries corresponding to transactions that have been fully executed on the table.

8. The method of claim 7, wherein each of the one or more sequential change tracking entries in the change tracking stream comprises a timestamp indicating when a corresponding transaction was executed, and wherein the method further comprises:

reading the change tracking stream from a first timestamp to a second timestamp to determine a delta for database data between the first timestamp and the second timestamp.

9. The method of claim 8, wherein the first timestamp indicates a most recent time the change tracking stream was read, and the second timestamp indicates a present time, and wherein the delta for the database data between the first timestamp and the second timestamp indicates one or more modifications made to the table since the most recent time the change tracking stream was read.

10. The method of claim 7, wherein each of the one or more sequential change tracking entries in the change tracking stream comprises a timestamp indicating when a corresponding transaction was executed, and wherein the method further comprises:
reading the change tracking stream to determine a change tracking summary between a first timestamp and a second timestamp, wherein the change tracking summary comprises an indication of incremental modifications made to the table between the first timestamp and the second timestamp.

11. A system, comprising:
one or more processors; and
data storage containing instructions executable by the one or more processors to perform operations comprising:
generating a micro-partition based on execution of a transaction on a table of a database, the micro-partition reflecting changes made to the table by the transaction;
generating a change tracking entry in response to the execution of the transaction, the change tracking entry comprising an indication of one or more modifications made to the table by the transaction and an indication of the micro-partition generated based on the execution of the transaction;
storing the change tracking entry in the micro-partition as metadata; and
responsive to storing the change tracking entry, removing at least one existing micro-partition from the table.

12. The system of claim 11, wherein the transaction comprises one or more of an insert, a delete, an update, and a merge of database data.

13. The system of claim 11, wherein the table comprises a plurality of immutable micro-partitions, and the transaction is executed on one or more micro-partitions of the plurality of immutable micro-partitions.

14. The system of claim 13, wherein the one or more processors further perform operations comprising:
generating one or more change tracking entries corresponding to each of one or more micro-partitions of the table that are impacted by the transaction; and
storing each of the one or more change tracking entries as metadata in an applicable micro-partition of the one or more micro-partitions.

15. The system of claim 13, wherein the micro-partition having the change tracking entry is separate from the one or more micro-partitions of the table.

16. The system of claim 11, wherein the change tracking entry further comprises one or more of:
a timestamp indicating when the transaction was requested;
an identifier of a user that requested the transaction;
an identifier of an account that requested the transaction; and
a minimum and maximum of data values inserted by the transaction.

17. The system of claim 11, wherein the one or more processors further perform operations comprising:
entering the change tracking entry into a change tracking stream, the change tracking stream comprising one or more sequential change tracking entries corresponding to transactions that have been fully executed on the table.

18. The system of claim 17, wherein a first timestamp indicates a most recent time the change tracking stream was read, and a second timestamp indicates a present time, and wherein a delta for database data of the table between the first timestamp and the second timestamp indicates one or more modifications made to the table since the most recent time the change tracking stream was read.

19. The system of claim 17, wherein each of the one or more sequential change tracking entries in the change tracking stream comprises a timestamp indicating when a corresponding transaction was executed, and wherein the one or more processors further perform operations comprising:
reading the change tracking stream to determine a comprehensive change tracking summary between a first timestamp and a second timestamp, wherein the comprehensive change tracking summary comprises an indication of all incremental modifications made to the table between the first timestamp and the second timestamp.

20. A non-transitory computer-readable storage media storing instructions that, when executed by one or more processors, cause the one or more processors to perform operations comprising:
generating a micro-partition based on execution of a transaction on a table of a database, the micro-partition reflecting changes made to the table by the transaction;
generating a change tracking entry in response to the execution of the transaction, the change tracking entry comprising an indication of one or more modifications made to the table by the transaction and an indication of the micro-partition generated based on the execution of the transaction;
storing the change tracking entry in the micro-partition as metadata; and
responsive to storing the change tracking entry, removing at least one existing micro-partition from the table.

21. The non-transitory computer-readable storage media of claim 20, wherein generating the change tracking entry comprises:
generating one or more change tracking entries corresponding to each of the one or more micro-partitions of the table that are impacted by the transaction.

22. The non-transitory computer-readable storage media of claim 20, wherein the micro-partition having the change tracking entry is separate from one or more micro-partitions of the table that comprise database data.

23. The non-transitory computer-readable storage media of claim 20, the operations further comprising:
entering the change tracking entry into a change tracking stream, the change tracking stream comprising one or more sequential change tracking entries corresponding to transactions that have been fully executed on the table.

24. The non-transitory computer-readable storage media of claim 23, wherein each of the one or more sequential change tracking entries in the change tracking stream comprises a timestamp indicating when a corresponding transaction was executed, and wherein the operations further comprising:
    reading the change tracking stream from a first timestamp to a second timestamp to determine a delta for database data between the first timestamp and the second timestamp.

25. The non-transitory computer-readable storage media of claim 24, wherein the first timestamp indicates a most recent time the change tracking stream was read, and the second timestamp indicates a present time, and wherein the delta for the database data between the first timestamp and the second timestamp indicates one or more modifications made to the table since the most recent time the change tracking stream was read.

* * * * *